(12) United States Patent
Uchiyama

(10) Patent No.: US 10,555,143 B2
(45) Date of Patent: Feb. 4, 2020

(54) COMMUNICATION DEVICE, COMMUNICATION METHOD, TRANSMISSION DEVICE AND RECEPTION DEVICE

(71) Applicant: SONY CORPORATION, Tokyo (JP)

(72) Inventor: Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/765,912

(22) PCT Filed: Jan. 17, 2017

(86) PCT No.: PCT/JP2017/001437
§ 371 (c)(1),
(2) Date: Apr. 4, 2018

(87) PCT Pub. No.: WO2017/135028
PCT Pub. Date: Aug. 10, 2017

(65) Prior Publication Data
US 2018/0288588 A1 Oct. 4, 2018

(30) Foreign Application Priority Data
Feb. 4, 2016 (JP) .................................. 2016-020196

(51) Int. Cl.
*H04W 4/40* (2018.01)
*H04W 72/04* (2009.01)
(Continued)

(52) U.S. Cl.
CPC ......... *H04W 4/40* (2018.02); *H04W 72/0406* (2013.01); *H04W 88/02* (2013.01); *H04W 88/08* (2013.01)

(58) Field of Classification Search
CPC ...... H04W 92/10; H04W 88/04; H04W 40/22
(Continued)

(56) References Cited

U.S. PATENT DOCUMENTS

2010/0278036 A1 11/2010 Dai
2015/0296411 A1 10/2015 Meyer et al.
(Continued)

FOREIGN PATENT DOCUMENTS

JP 2008-199504 A 8/2008
JP 2008-219409 A 9/2008
(Continued)

OTHER PUBLICATIONS

International Search Report dated Apr. 11, 2017, in PCT/JP2017/001437 filed Jan. 17, 2017.
(Continued)

*Primary Examiner* — Jeffrey M Rutkowski
*Assistant Examiner* — Sudesh M Patidar
(74) *Attorney, Agent, or Firm* — Xsensus LLP

(57) ABSTRACT

Cooperative V2X communication in a system wherein a network device (base station or road side unit RSU) transmits to a terminal device a signal indicating whether the network device supports cooperative V2X transmission of messages from the terminal device to a vehicle-mounted terminal device; and performs cooperative V2X communication by transmitting to the vehicle-mounted terminal device a message intended for it that is received from the terminal device; and wherein the terminal device determines whether the network device supports cooperative V2X communication based on the signal received from the network device; and, based on the determination, performs cooperative V2X communication with the vehicle-mounted terminal device with support from the network device by transmitting a message directly to the vehicle-mounted terminal device and transmitting the message intended for the vehicle-mounted terminal device to the network device.

25 Claims, 27 Drawing Sheets

(51) Int. Cl.
*H04W 88/02* (2009.01)
*H04W 88/08* (2009.01)

(58) Field of Classification Search
USPC .......................................... 370/329
See application file for complete search history.

(56) References Cited

U.S. PATENT DOCUMENTS

| | | | | |
|---|---|---|---|---|
| 2016/0242223 | A1* | 8/2016 | Brahmi | H04W 28/021 |
| 2016/0338095 | A1* | 11/2016 | Faurie | H04W 28/0278 |
| 2018/0007606 | A1* | 1/2018 | Lee | H04W 12/08 |

FOREIGN PATENT DOCUMENTS

| | | |
|---|---|---|
| JP | 2009-278557 A | 11/2009 |
| JP | 2010-1009600 A | 5/2010 |
| JP | 2011-142539 A | 7/2011 |
| JP | 2012-516593 A | 7/2012 |
| JP | 2012-209609 A | 10/2012 |
| JP | 2013-505603 A | 2/2013 |
| WO | WO 2014/048486 A1 | 4/2014 |
| WO | WO 2017/014592 A1 | 1/2017 |
| WO | WO2017028030 A1 * | 2/2017 ............ H04W 84/18 |

OTHER PUBLICATIONS

3GPP Draft; 5G White Paper Automotive, $3^{rd}$ Generation Partnership Project (3GPP). "5G Automotive Vision", (2015), 67 pages, XP051053269.

ZTE, 3GPP TSG RAN WG2 #92, R2-156613, "Enhancements for eNB type RSU and UE type RSU", Agenda Item: 7.11, (2015) 7 pages, XP051042463.

3GPP TSG-SA WG1 Meeting #69, draft6 S1-150059 (revision of S1-15xxxx), LG Electronics Inc., "V2I Use Case for Road Safety Services", Agenda Item: 5. New Study and Work Items, (2015), 5 pages, XP050960257.

3GPP TR 22.885 V14.0.0, Technical Report, $3^{rd}$ Generation Partnership Project; Technical Specification Group Services and System Aspects; Study on LTE support for Vehicle to Everything (V2X) services, Release 14, (2015), 50 pages.

Office Action issued in Japanese Application 2016-020196 dated Sep. 24, 2019.

* cited by examiner

[Fig. 1]
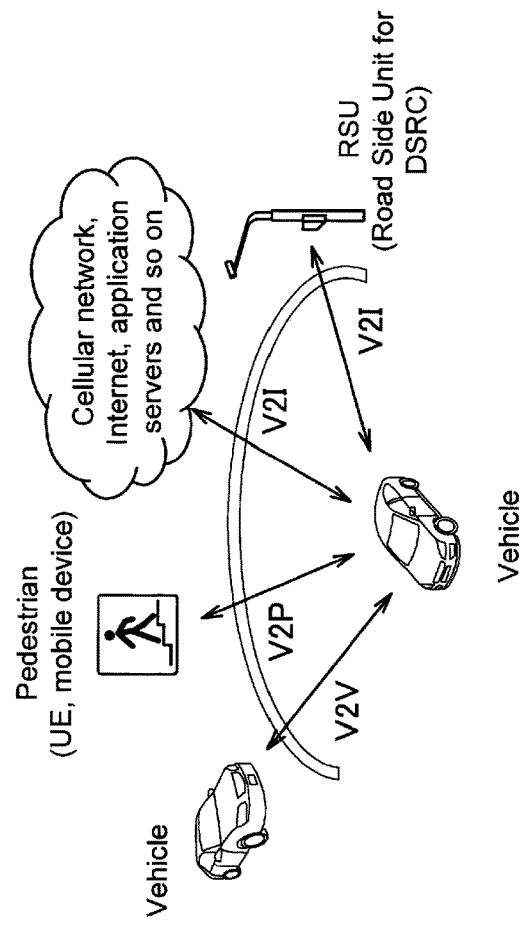
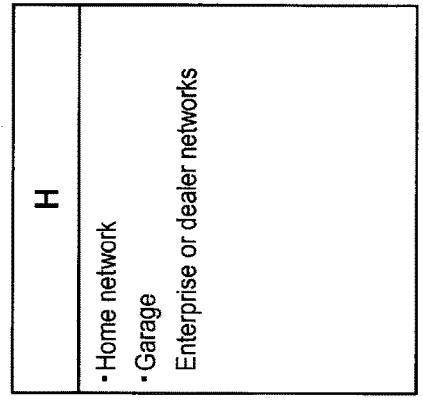
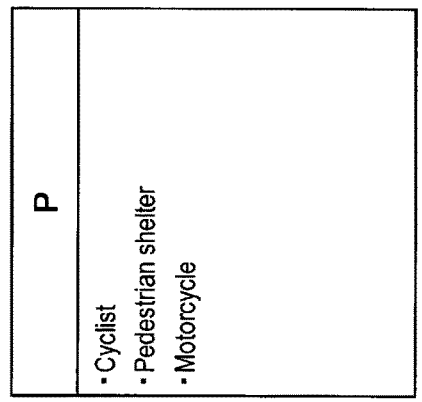
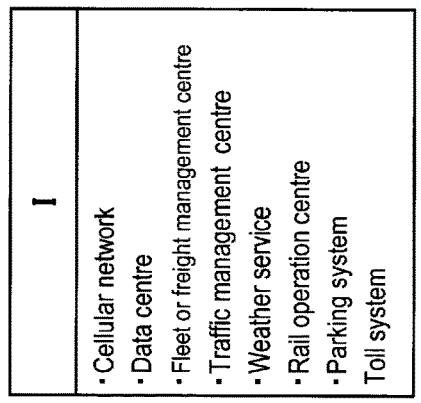
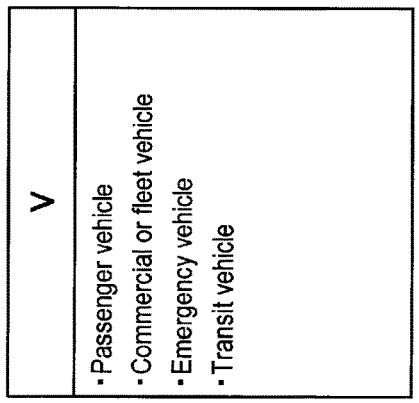

[Fig. 2]
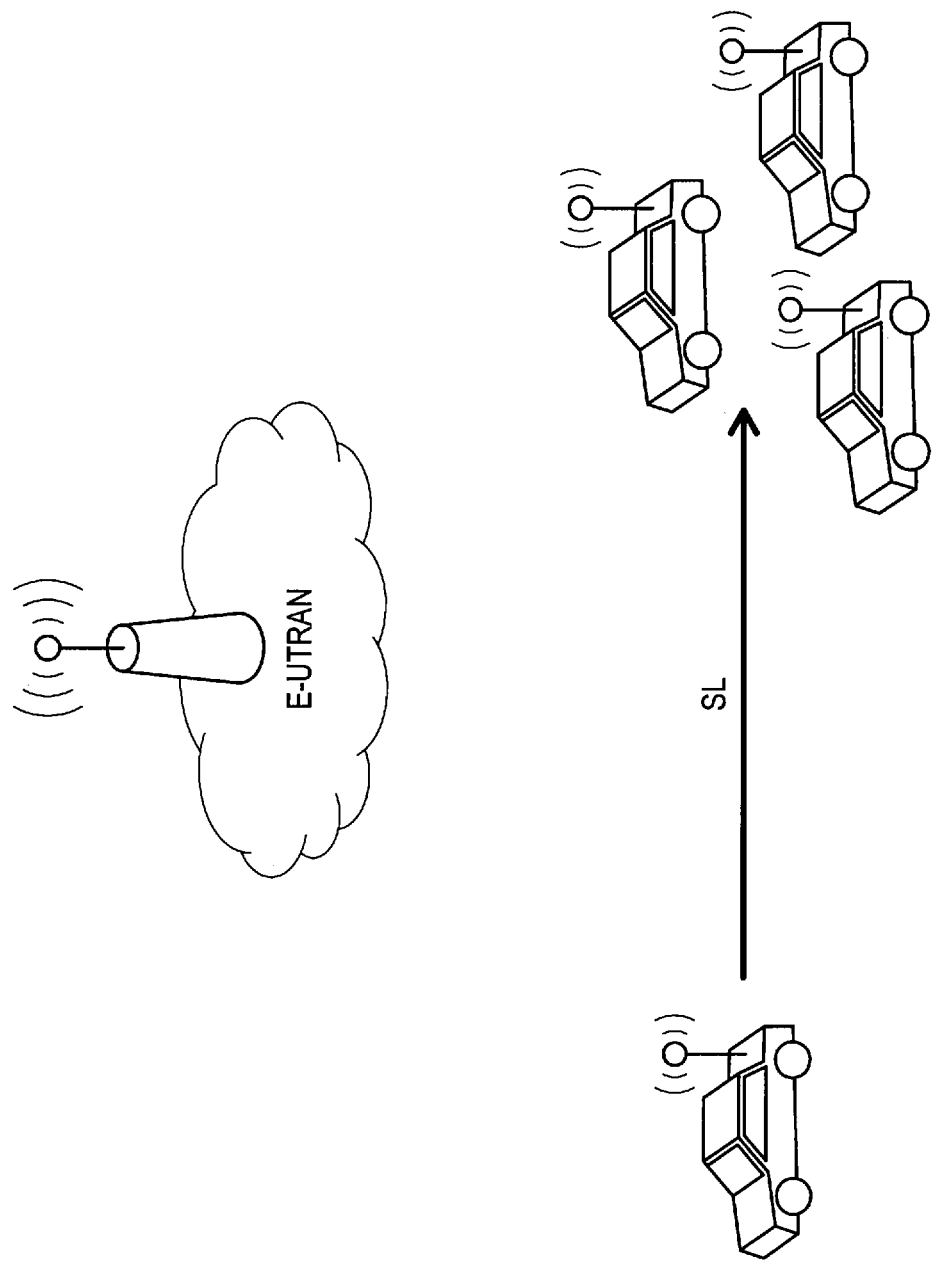

[Fig. 3]
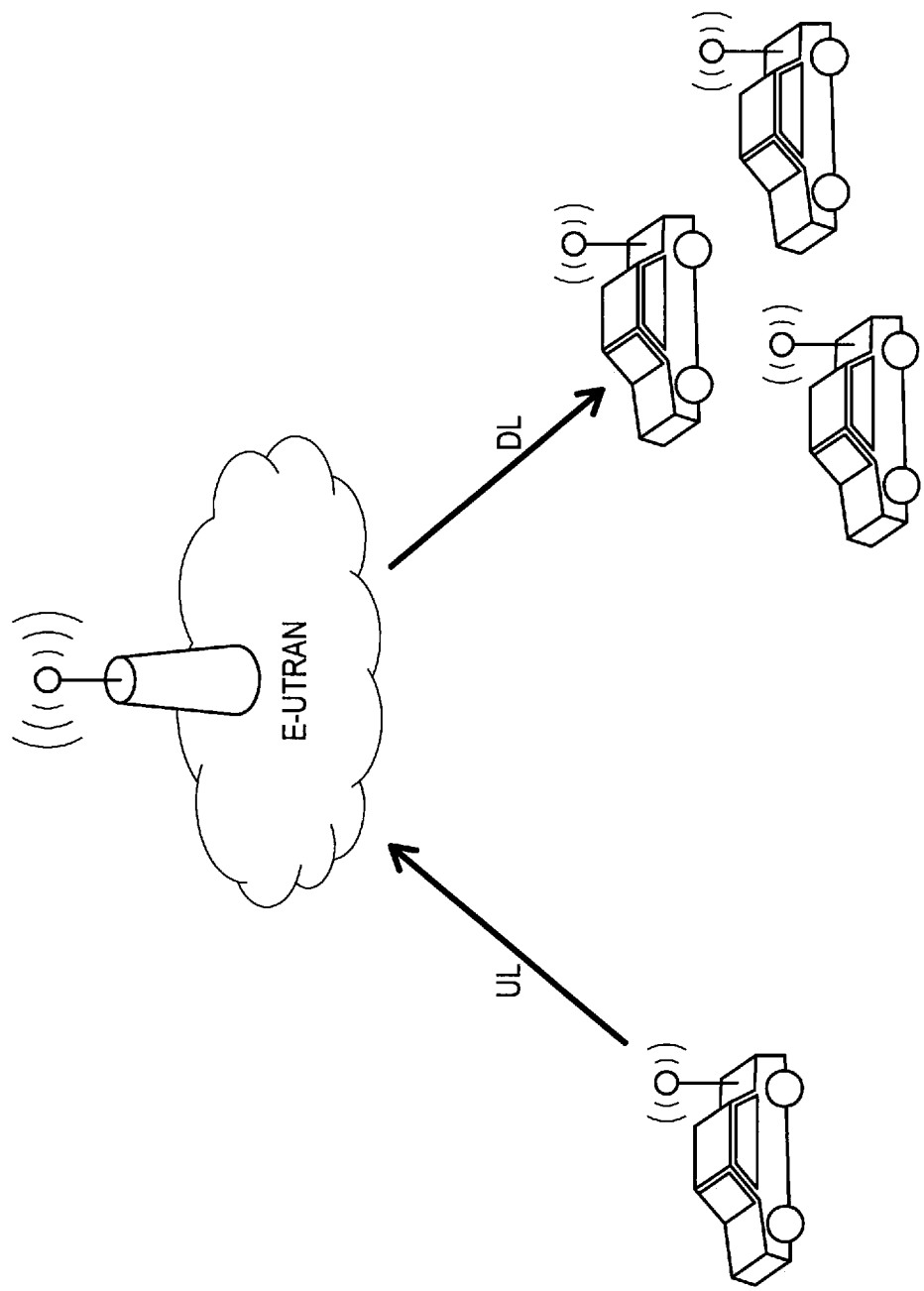

[Fig. 4]
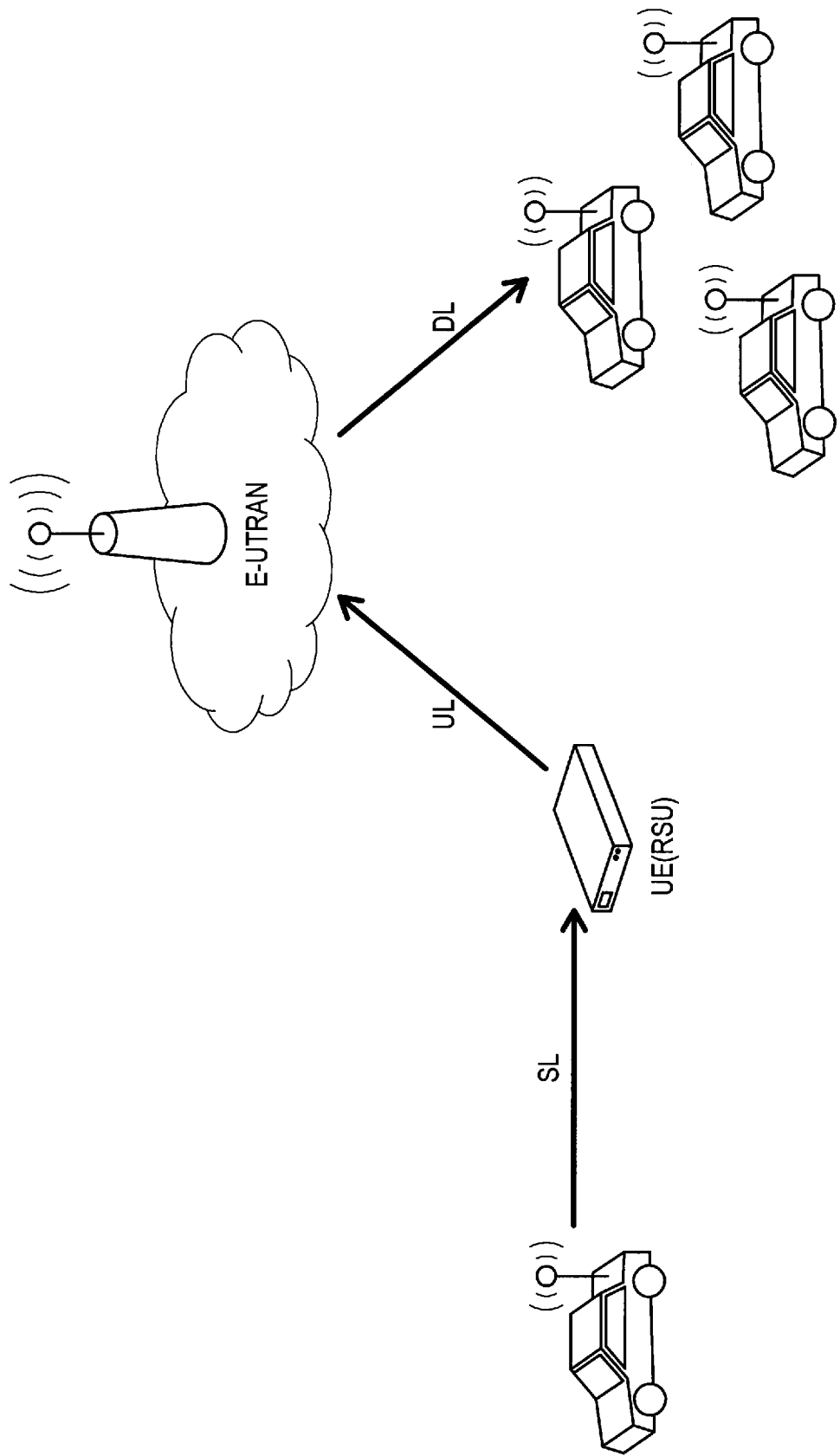

[Fig. 5]
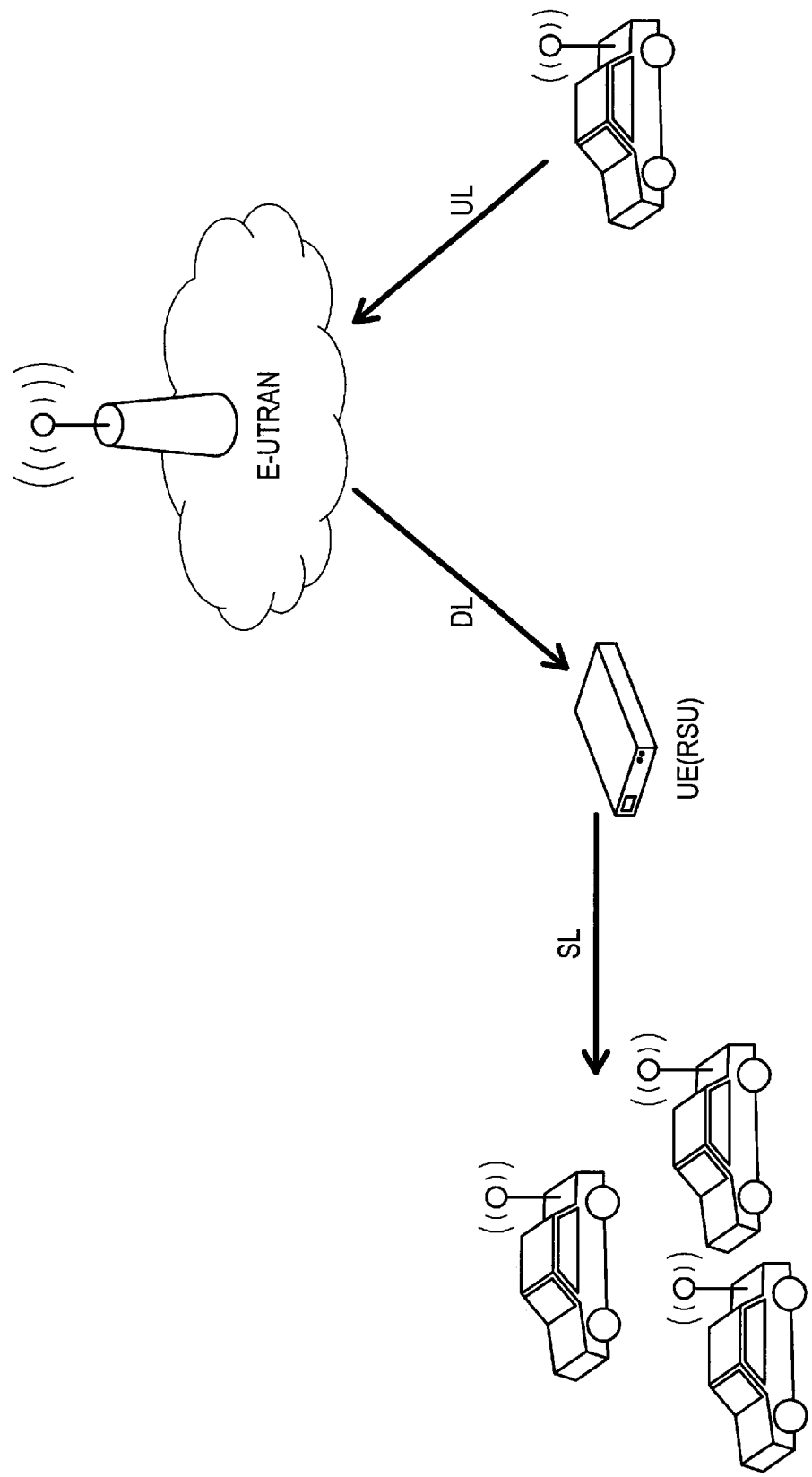

[Fig. 6]
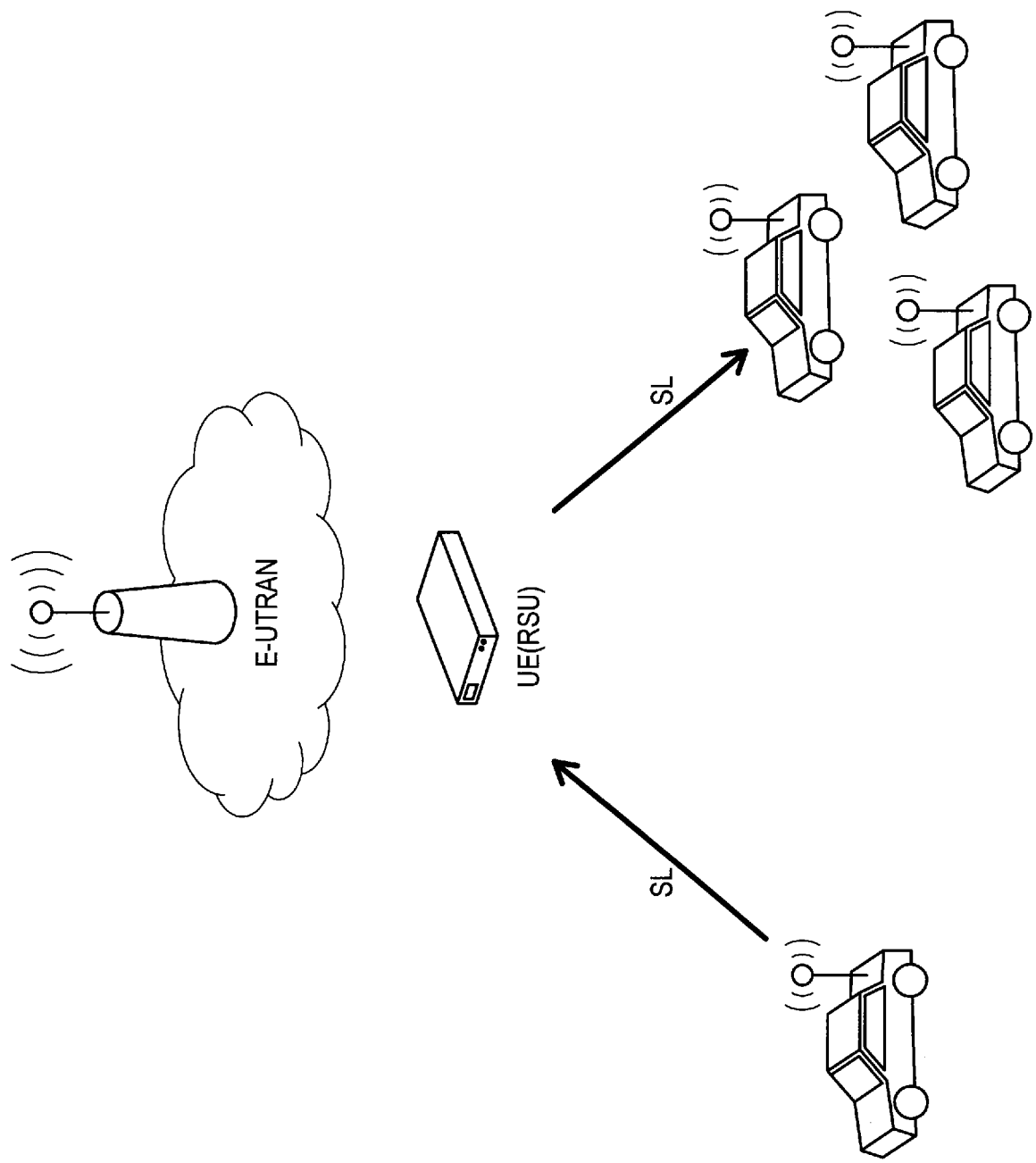

[Fig. 7]
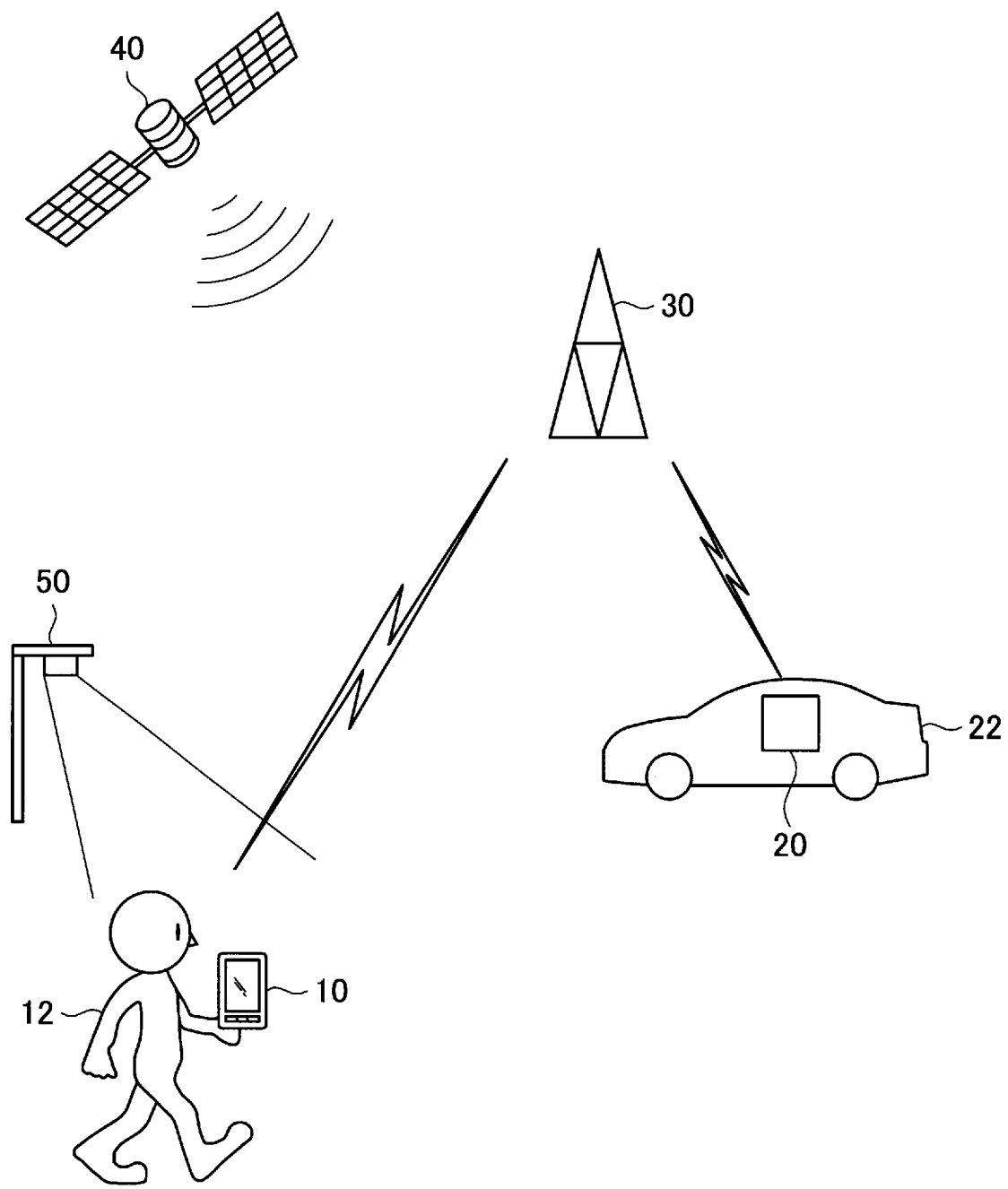

[Fig. 8]
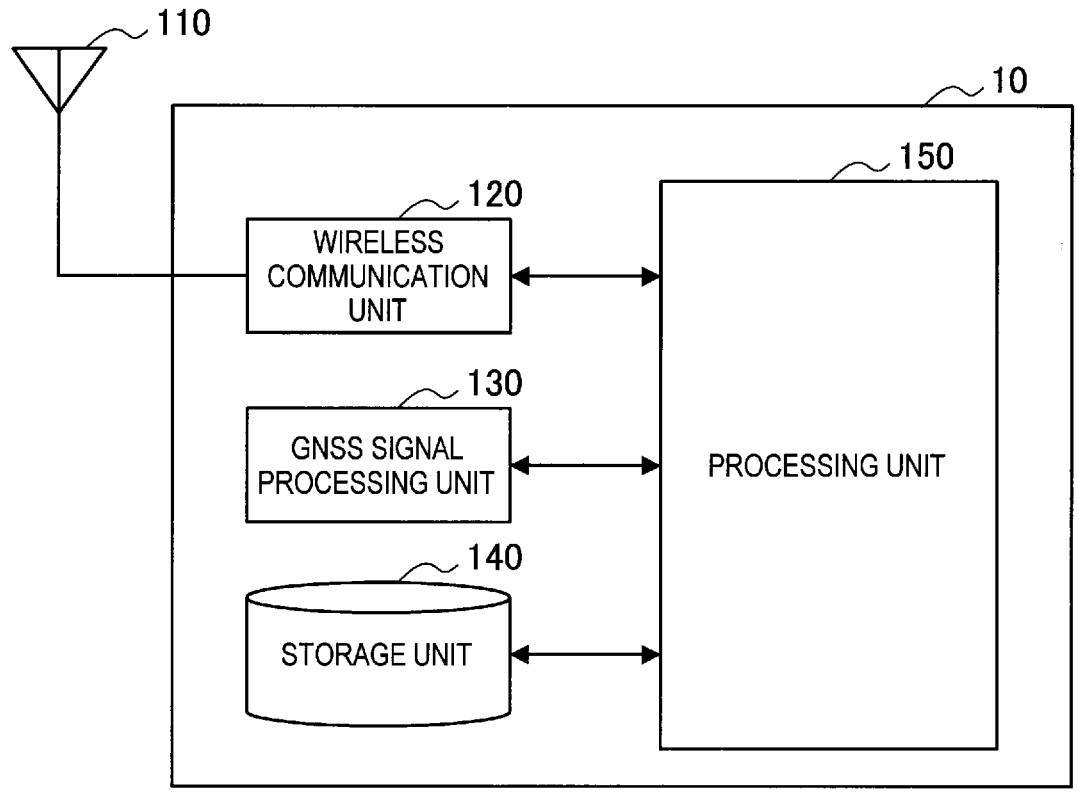
[Fig. 9]
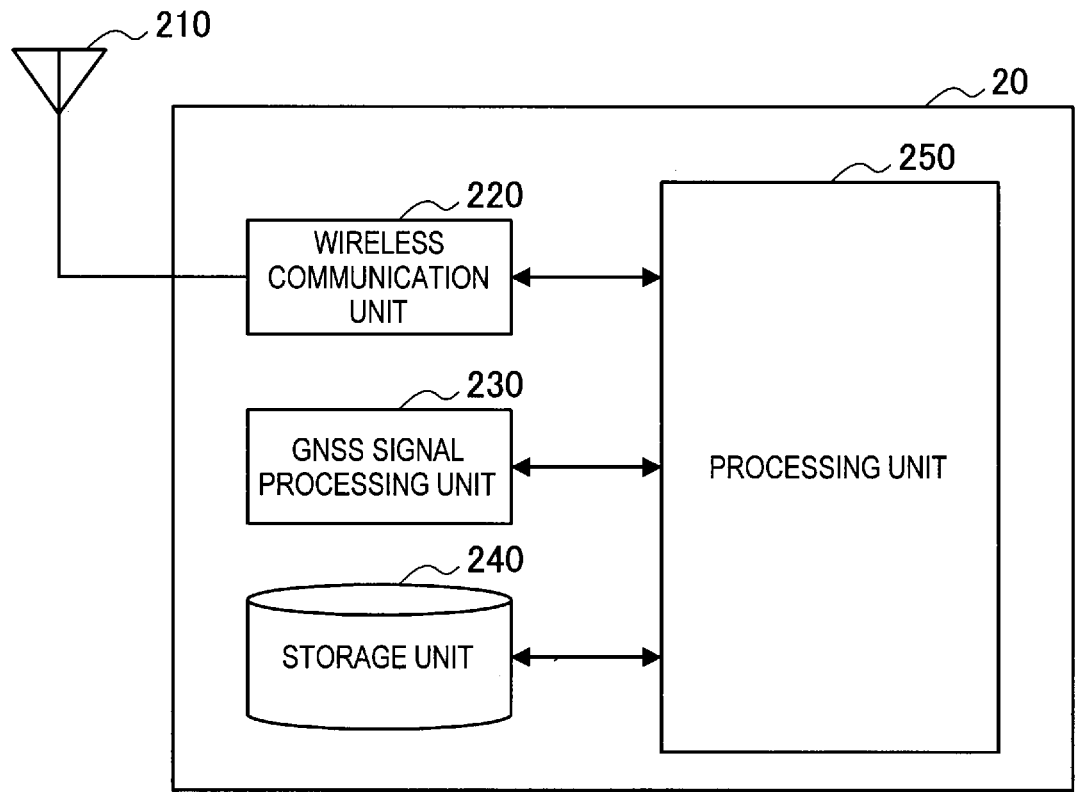

[Fig. 10]
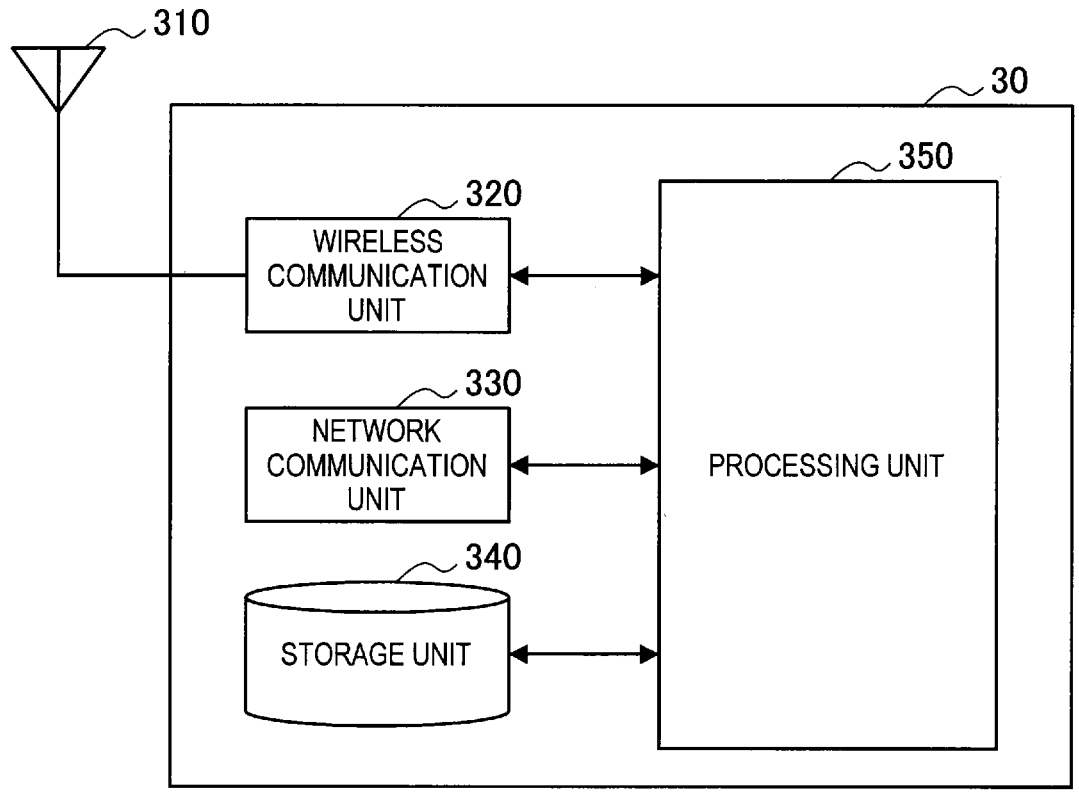
[Fig. 11]
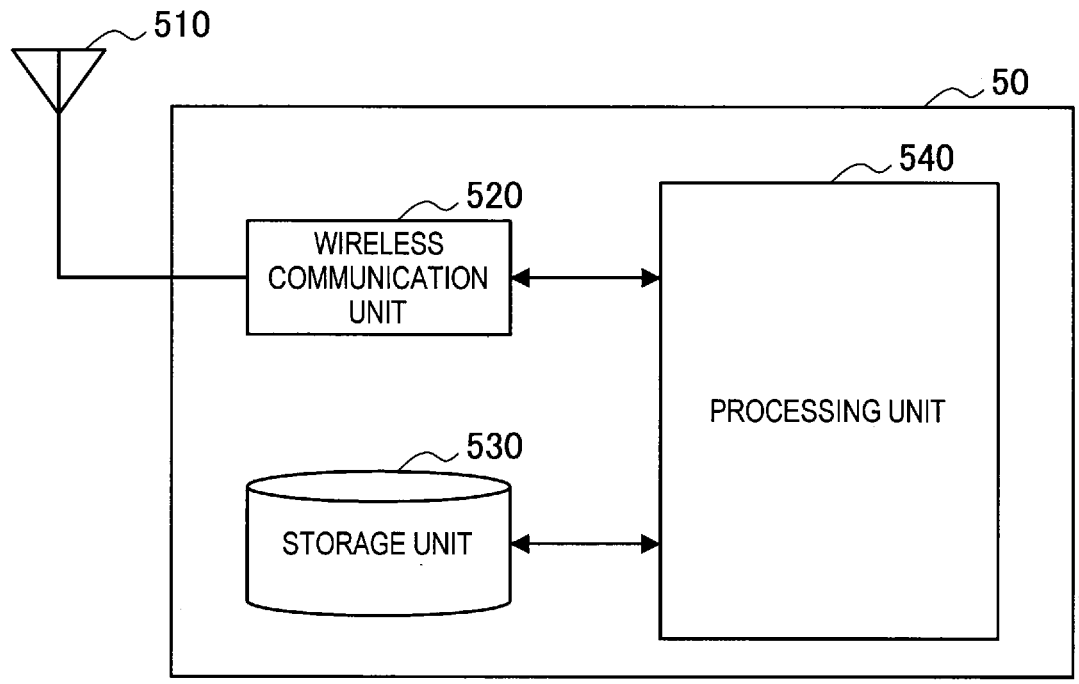

[Fig. 12]
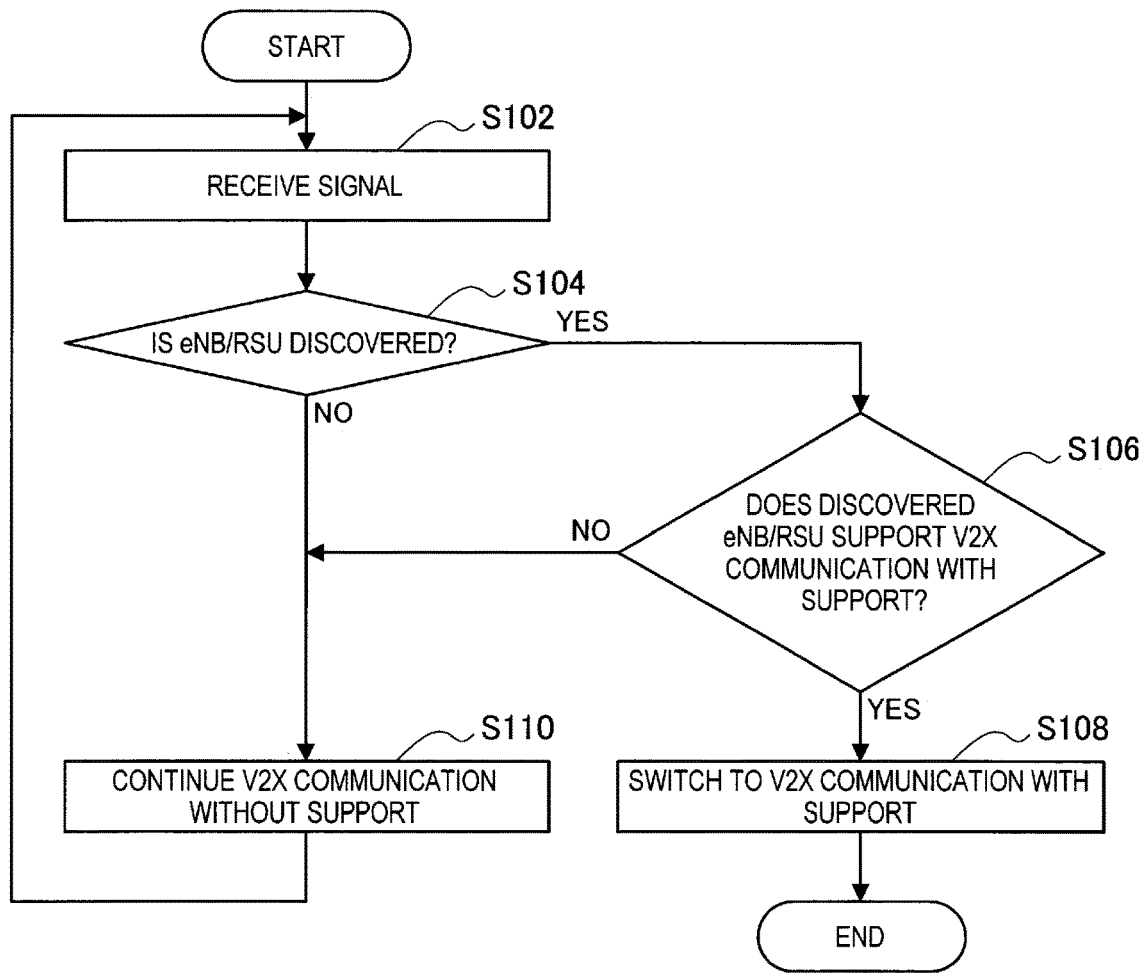
[Fig. 13]
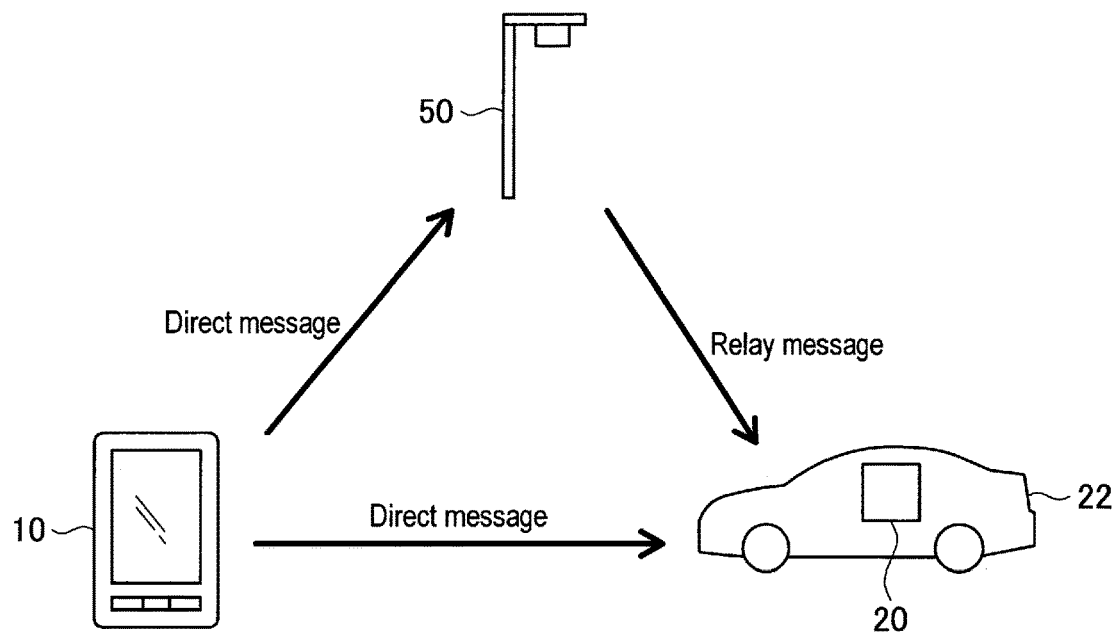

[Fig. 14]
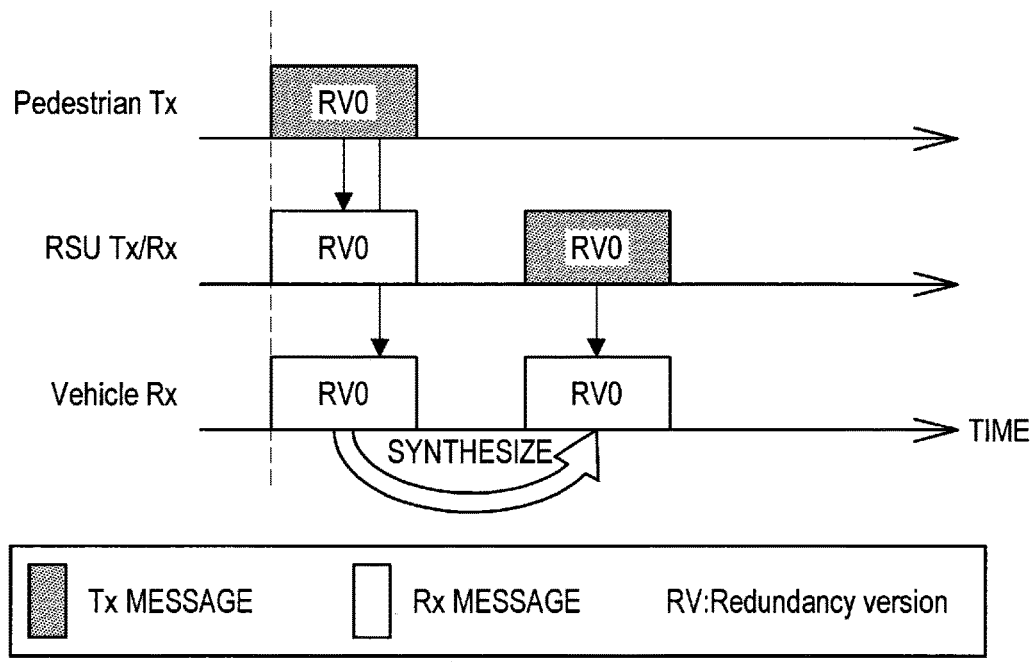
[Fig. 15]
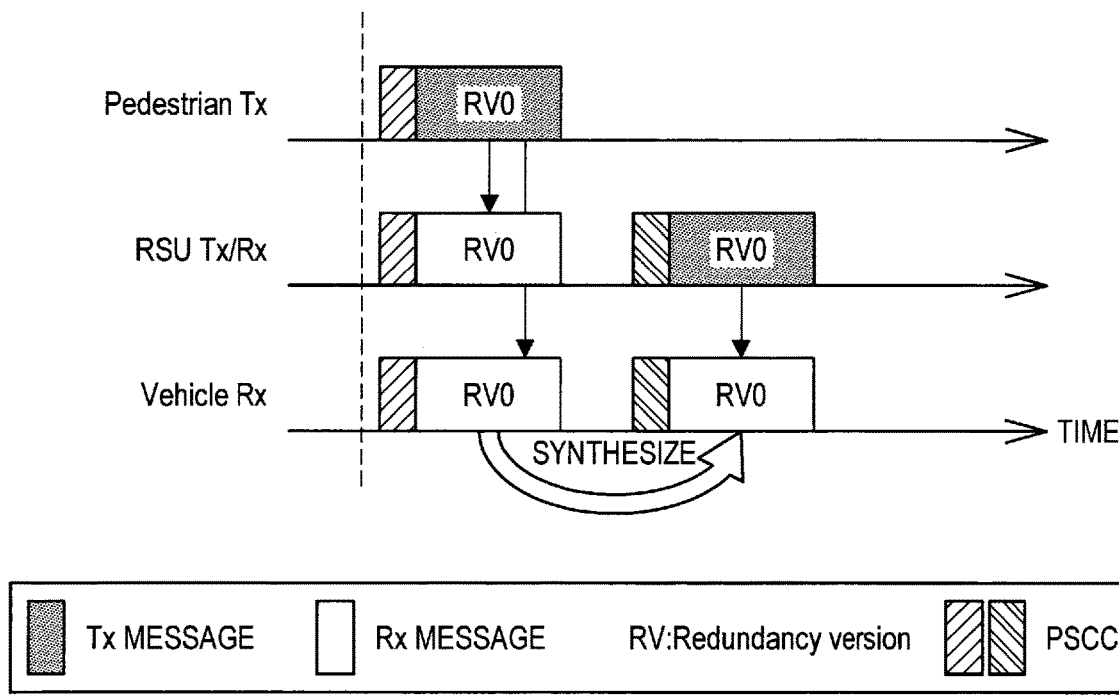

[Fig. 16]
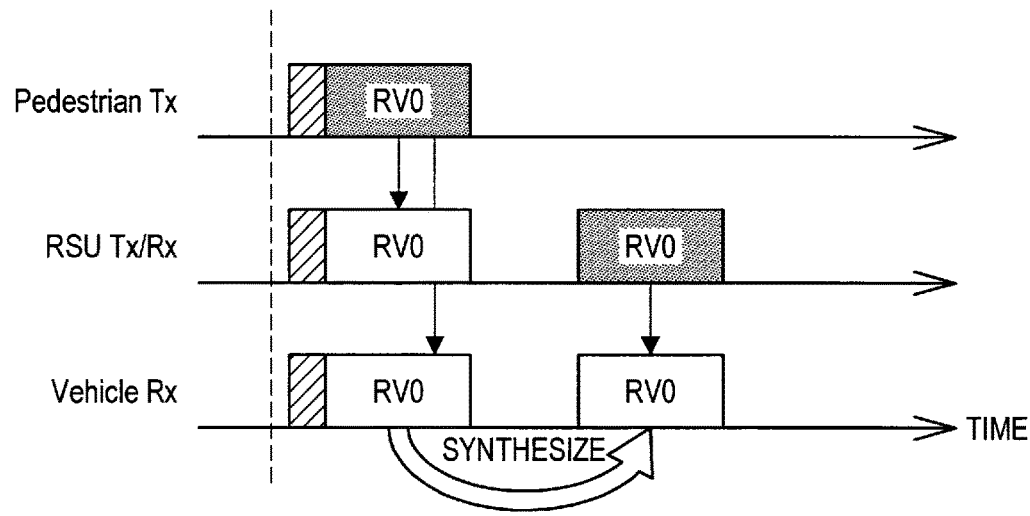
[Fig. 17]
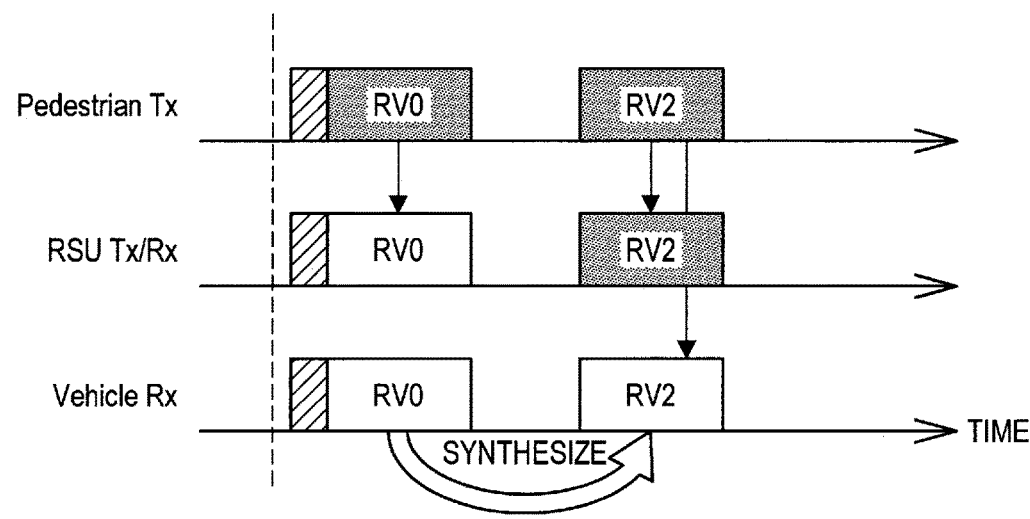

[Fig. 18]
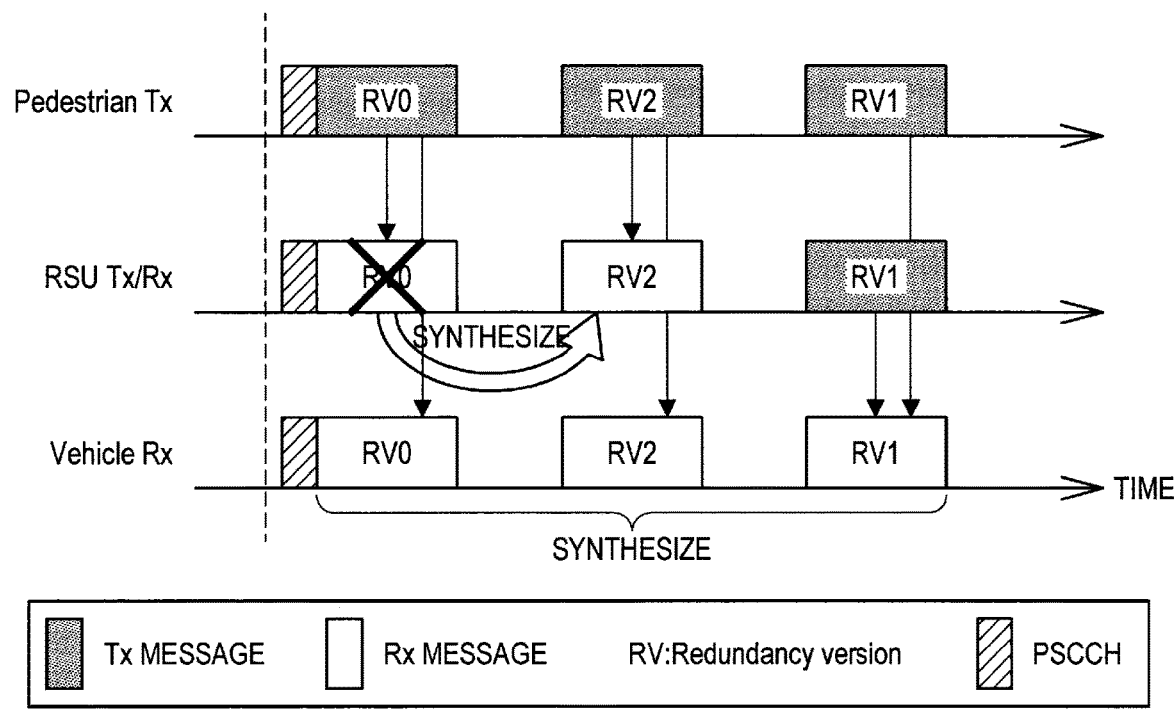

[Fig. 19]
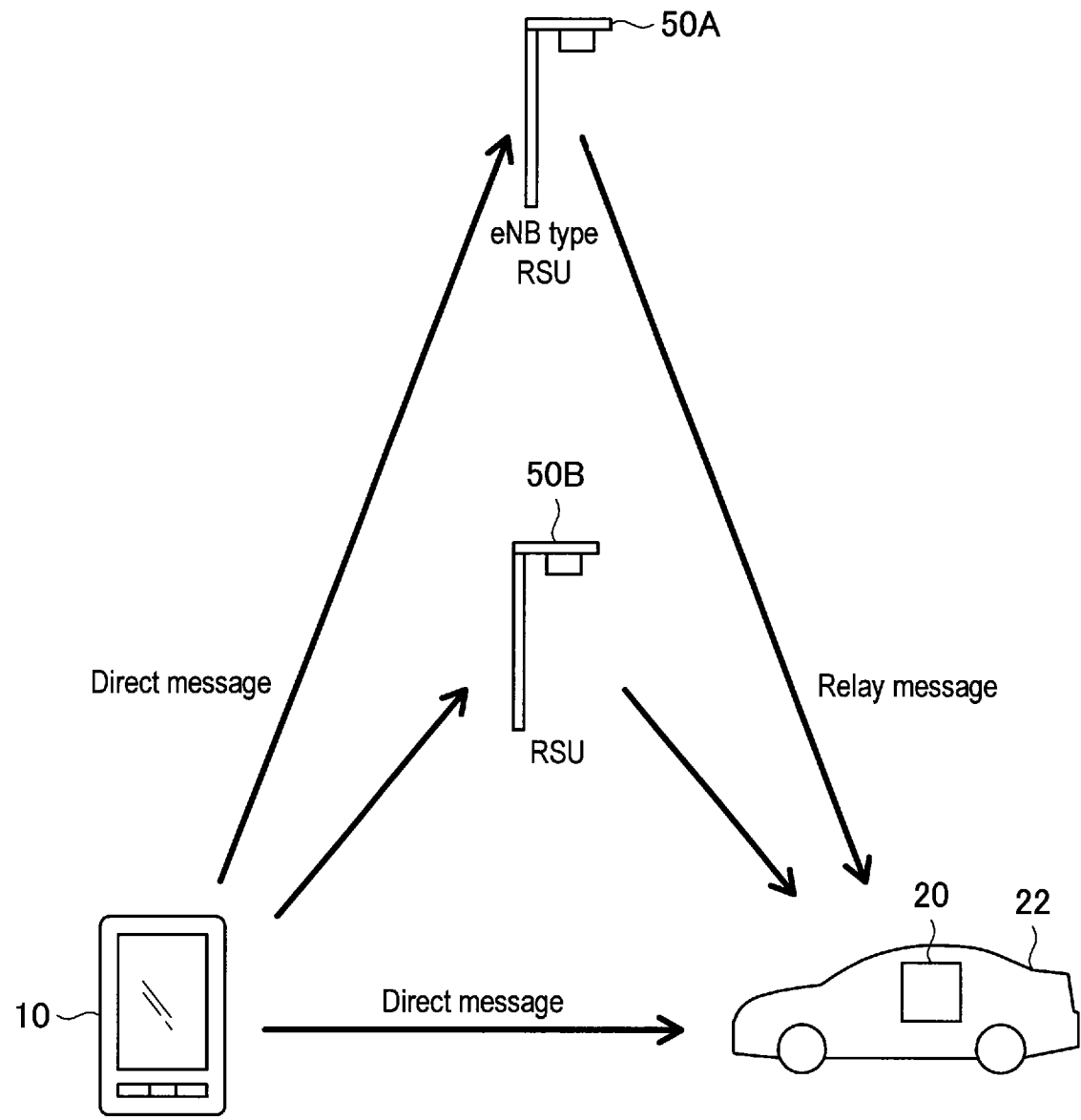

[Fig. 20]
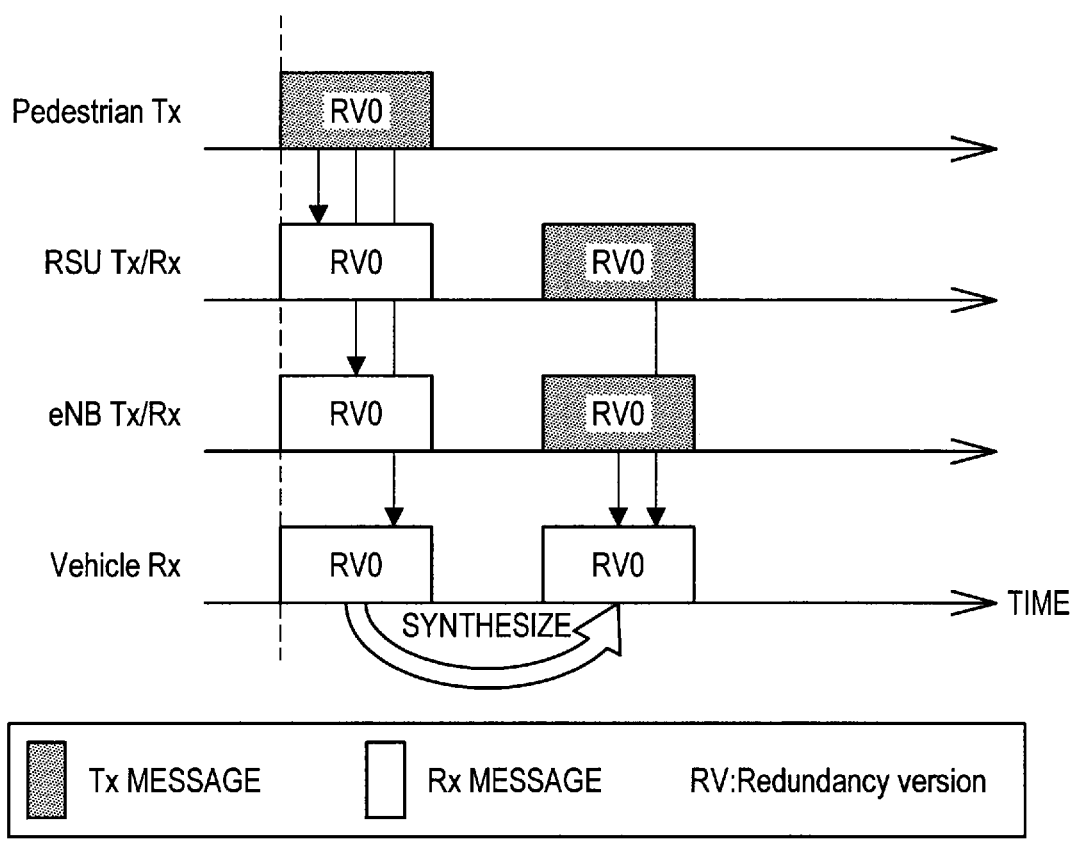

[Fig. 21]
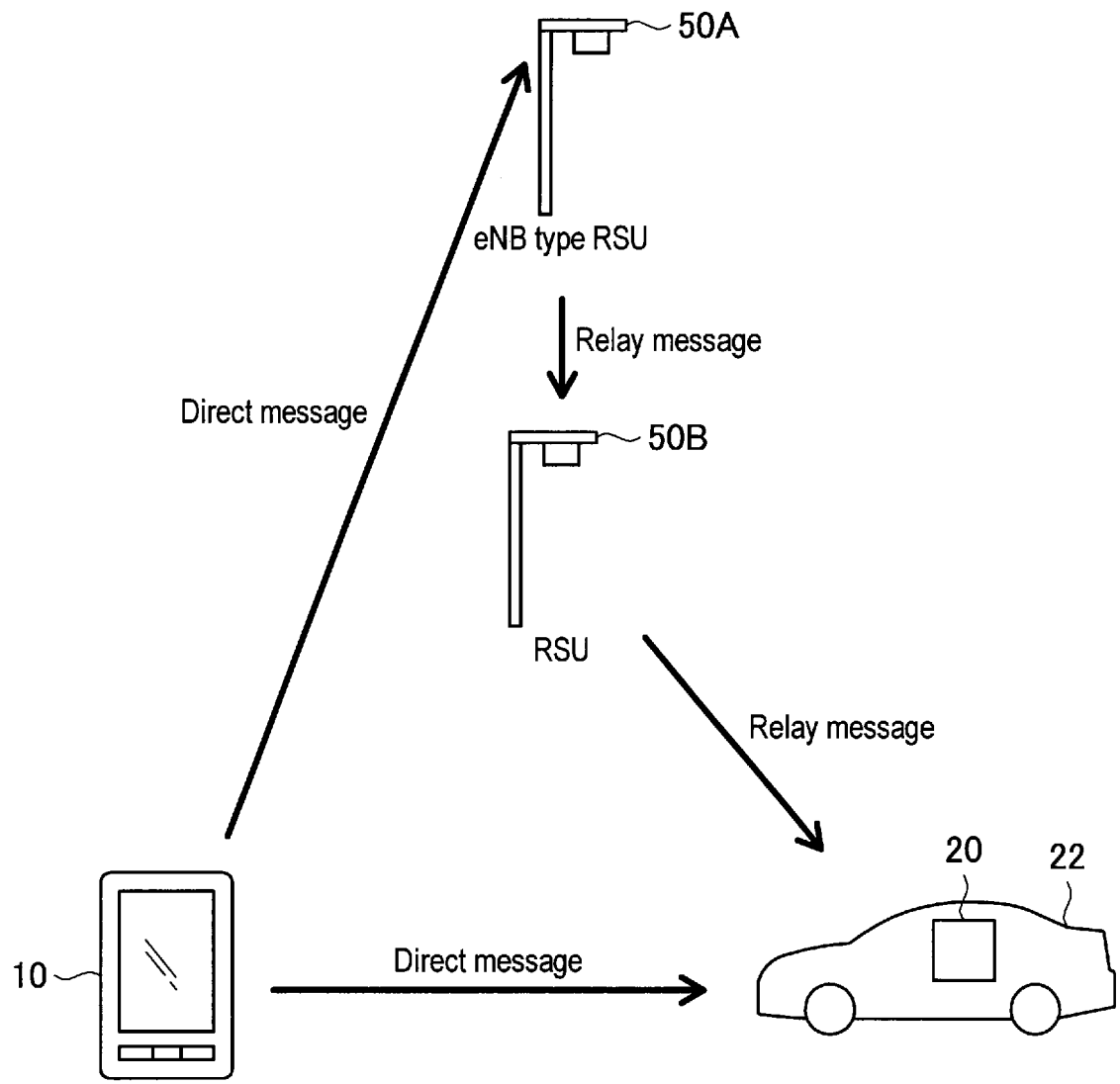

[Fig. 22]
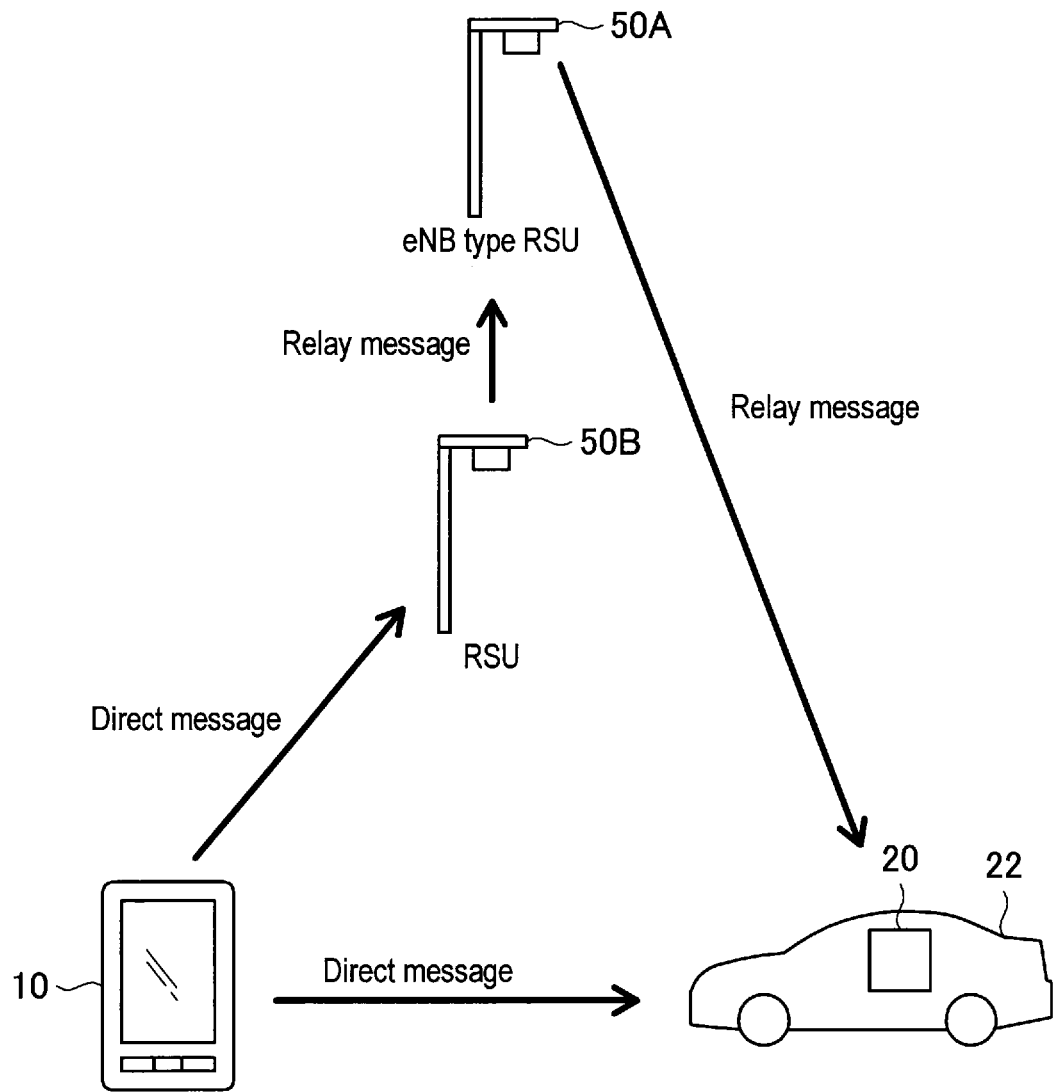

[Fig. 23]
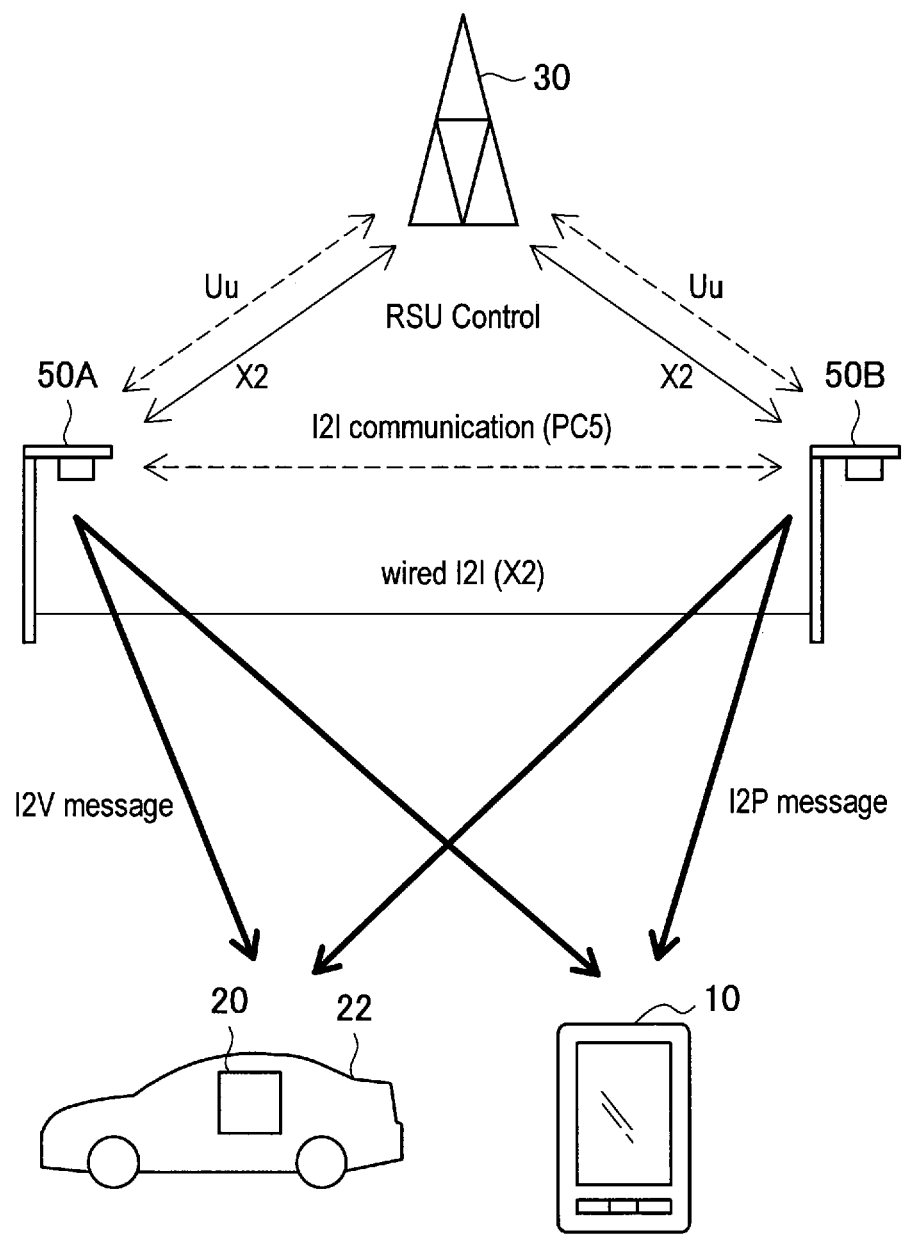

[Fig. 24]
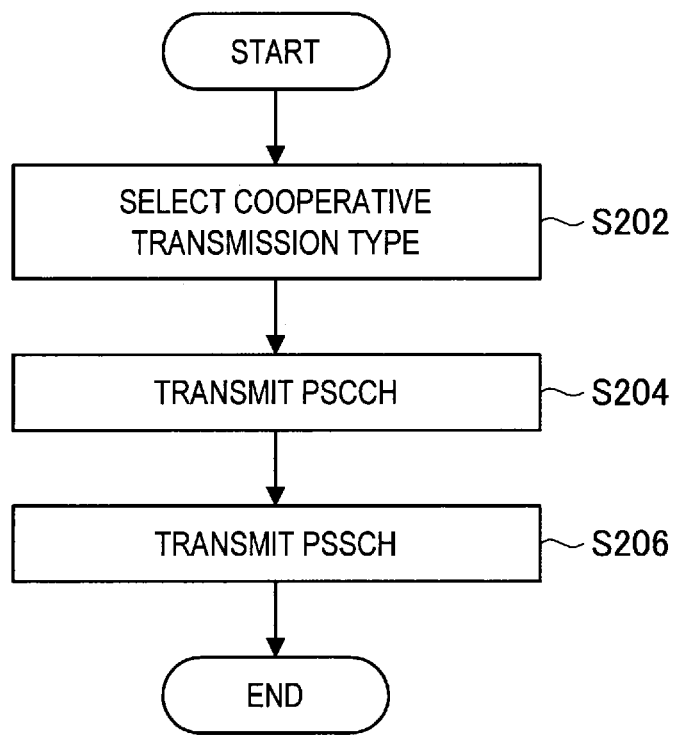

[Fig. 25]
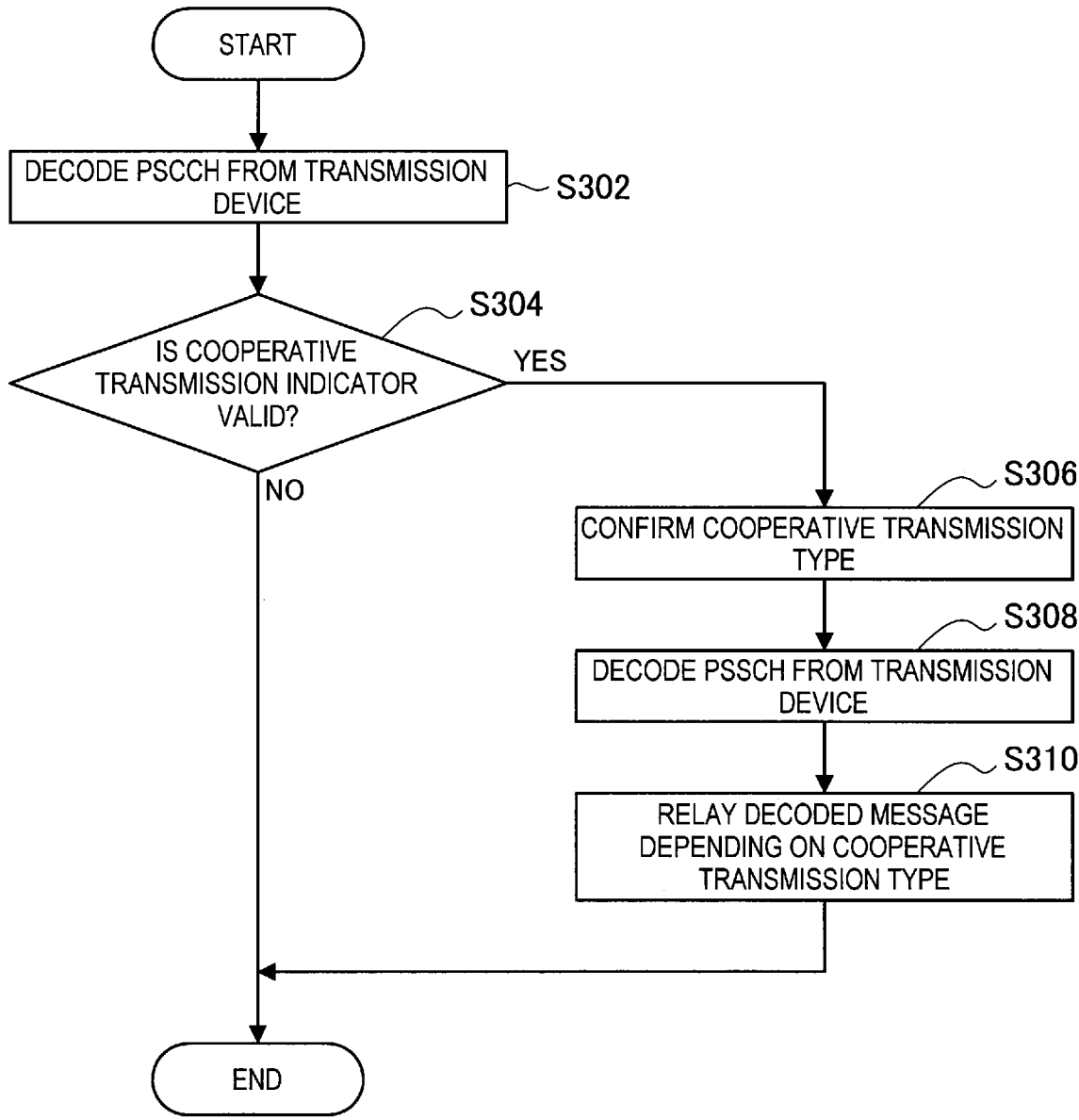

[Fig. 26]
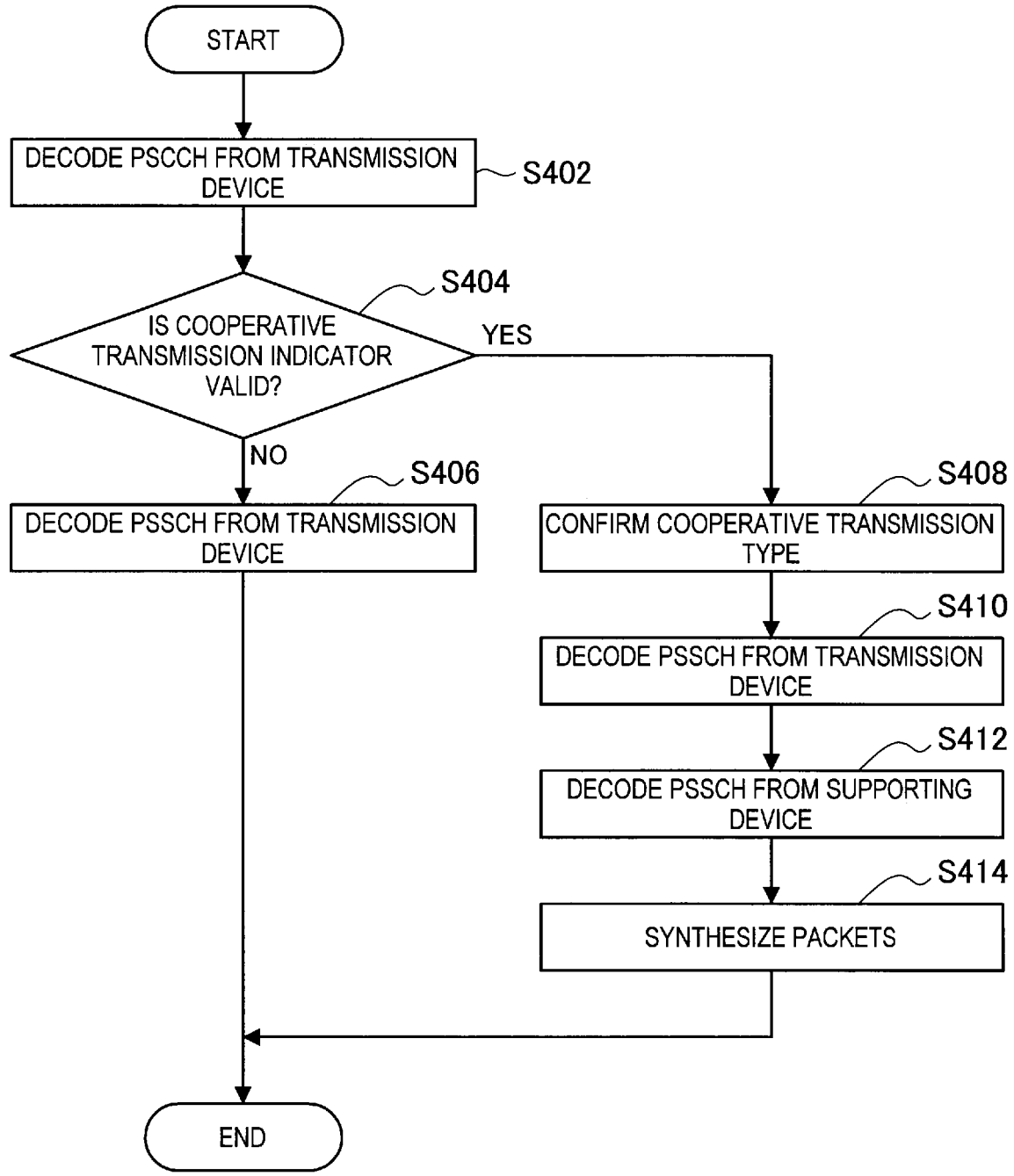

[Fig. 27]
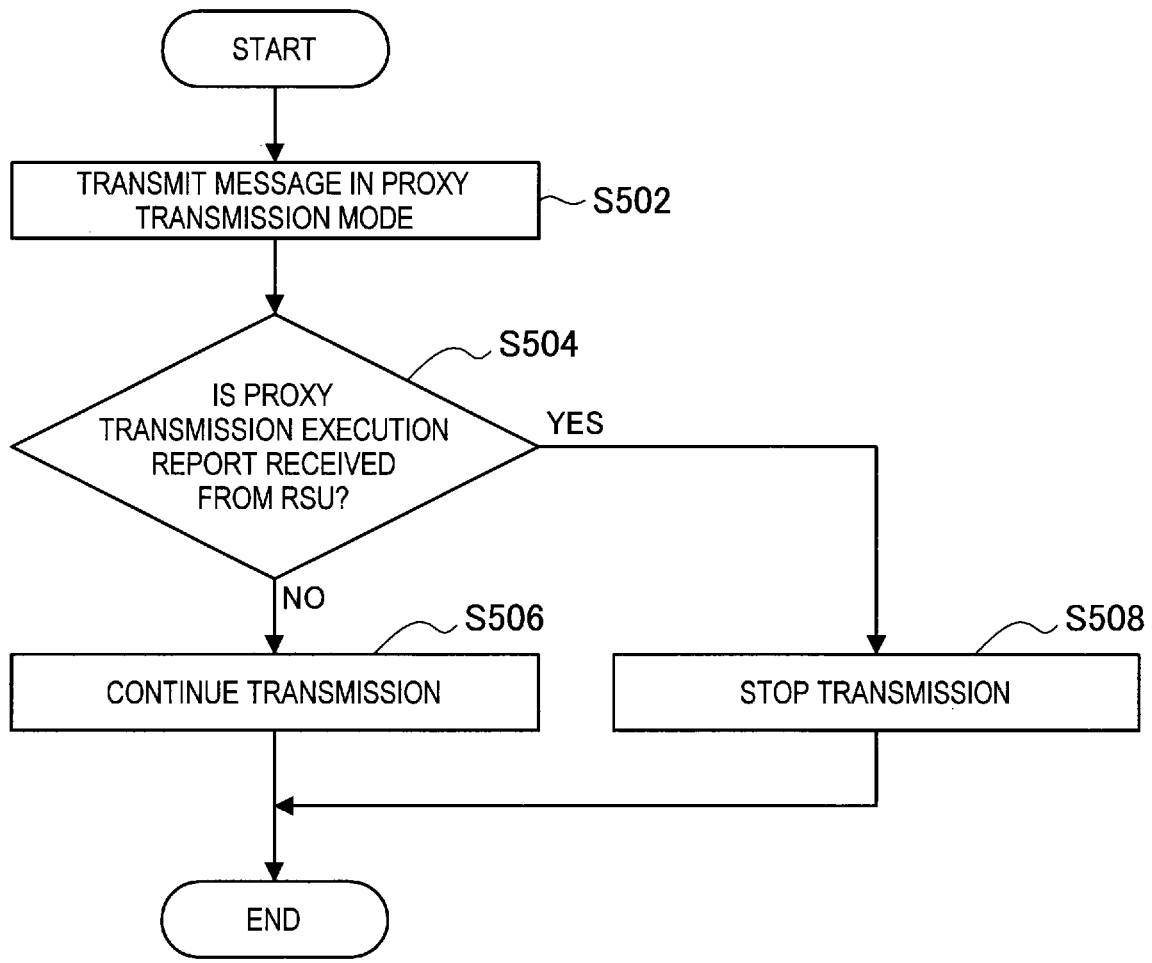

[Fig. 28]
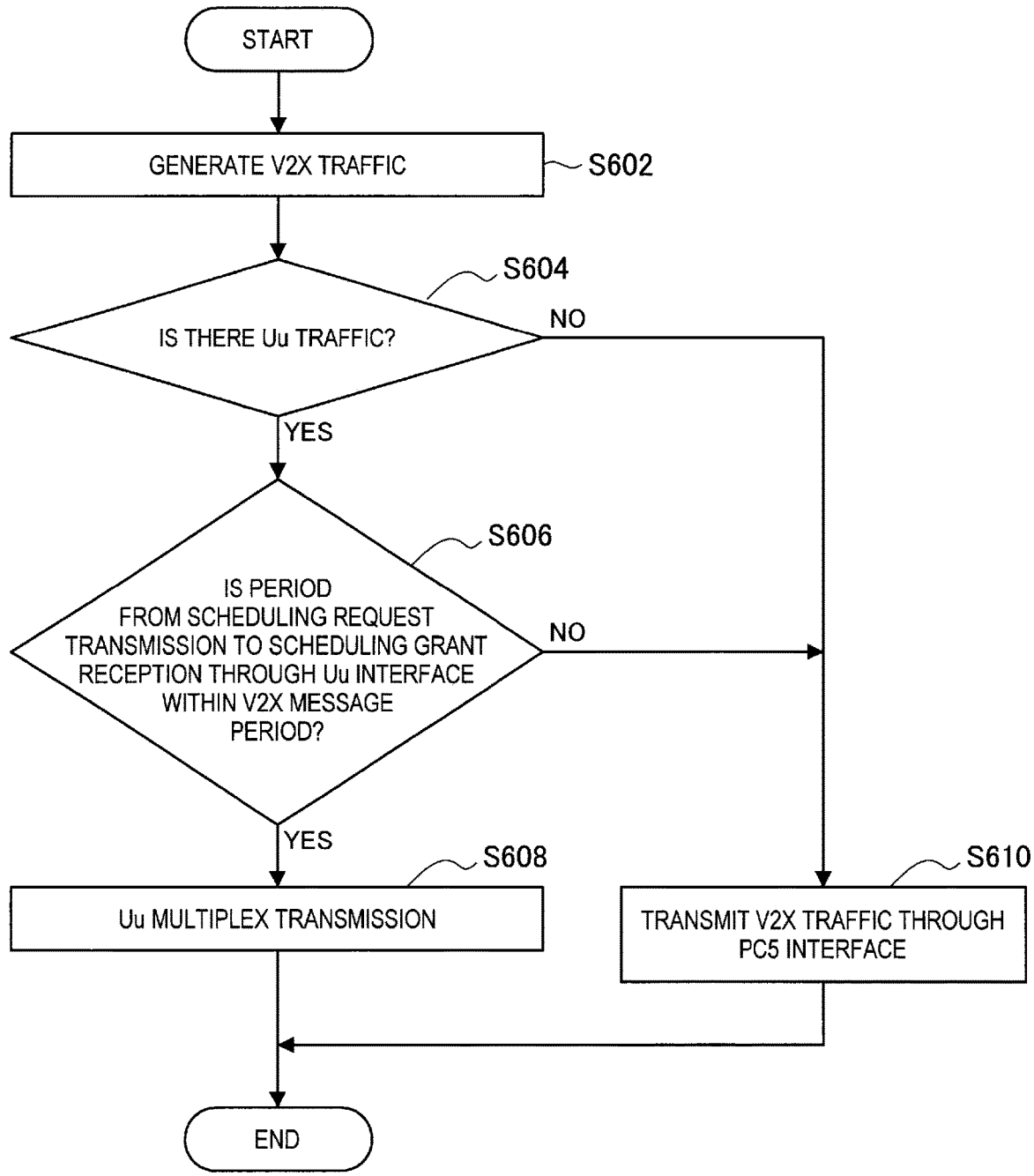

[Fig. 29]
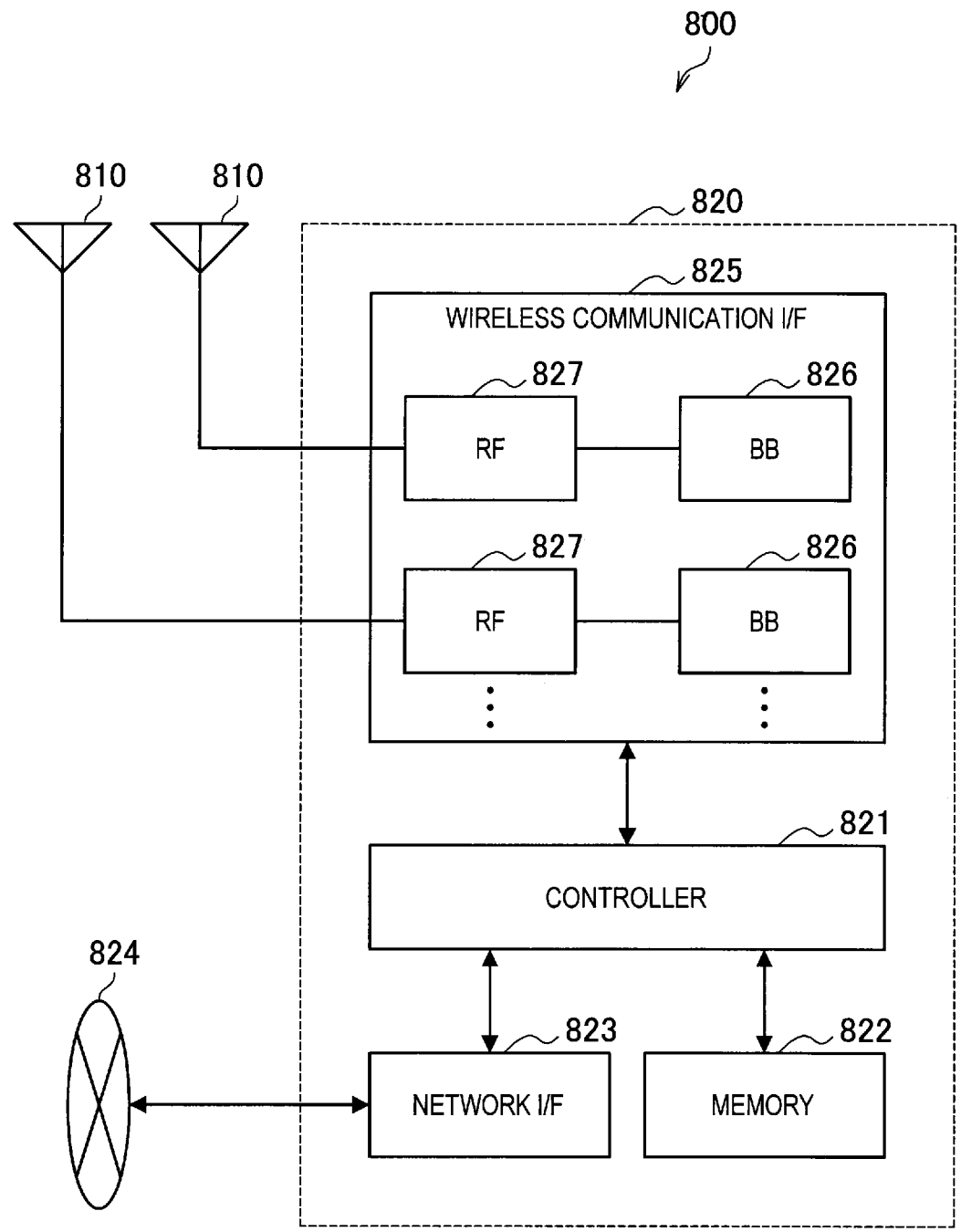

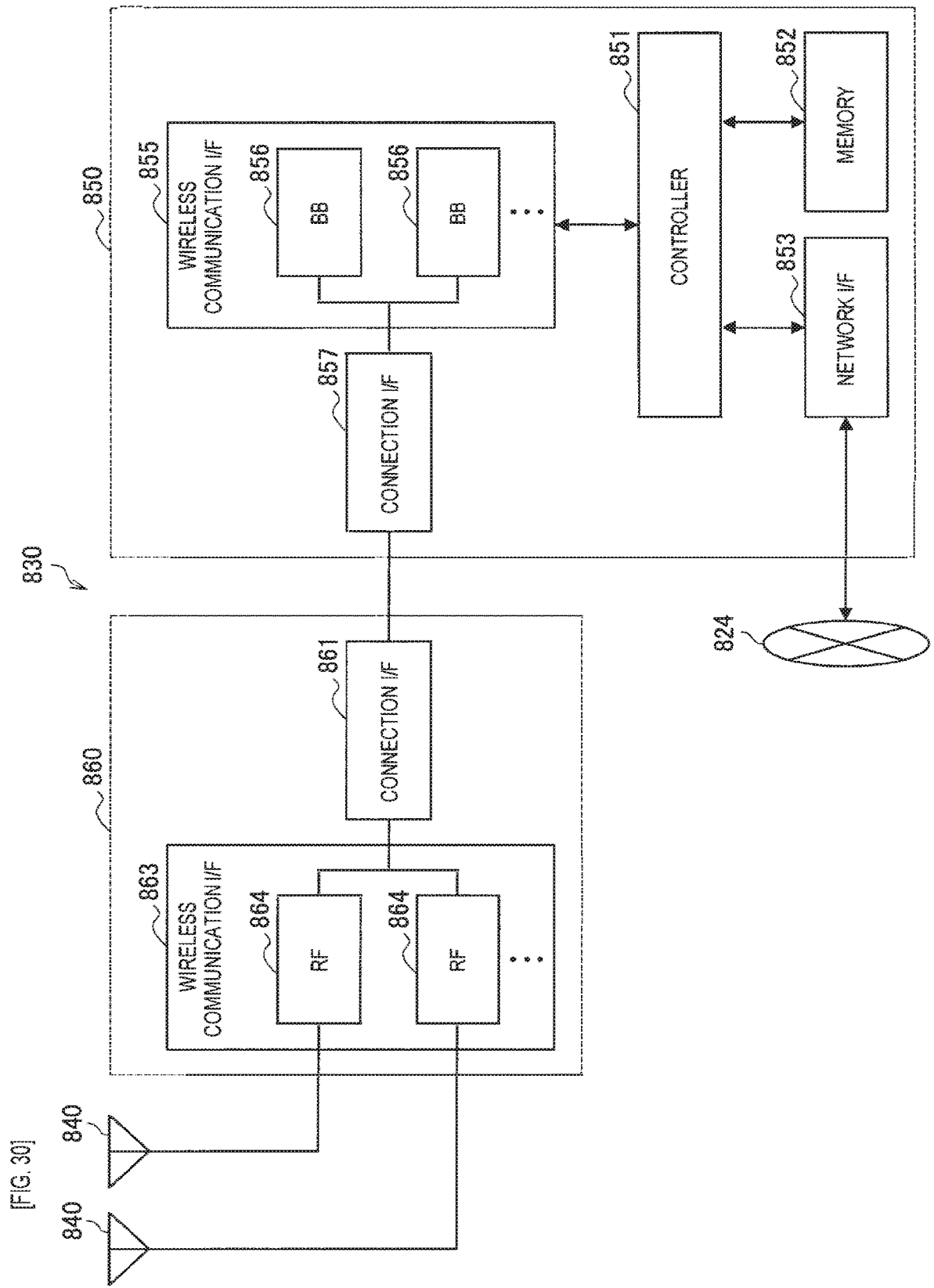

[Fig. 31]
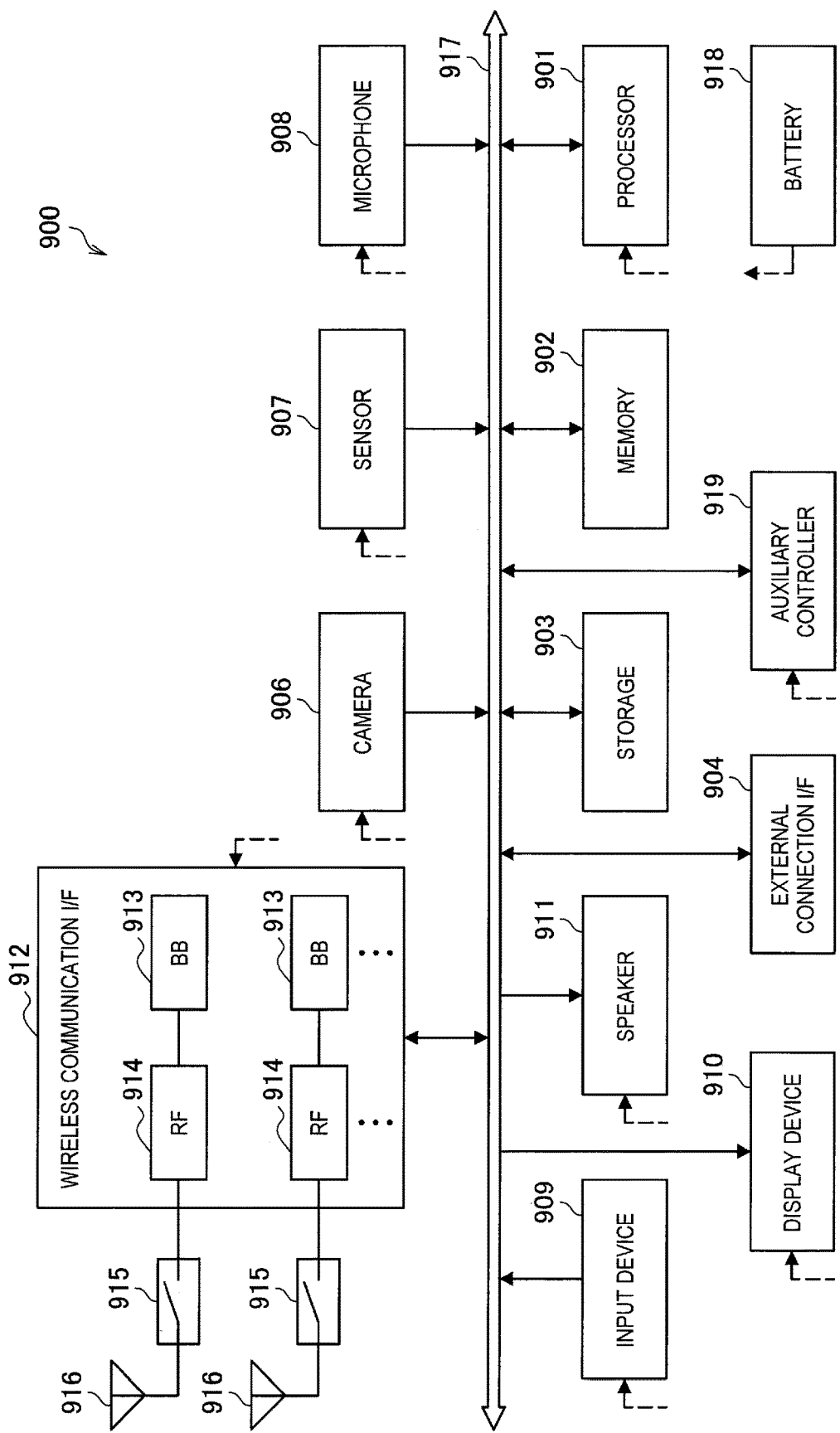

[Fig. 32]
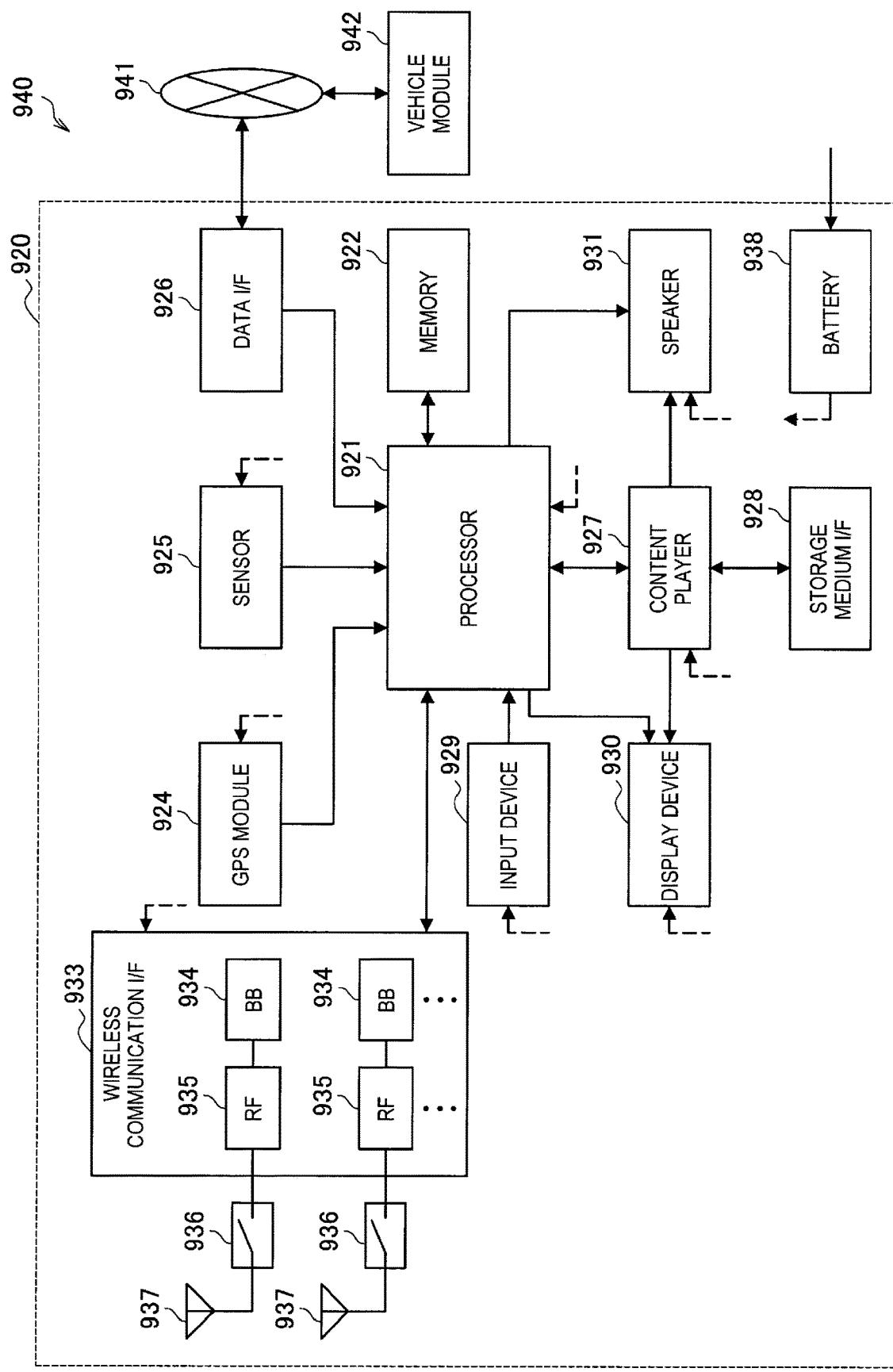

COMMUNICATION DEVICE, COMMUNICATION METHOD, TRANSMISSION DEVICE AND RECEPTION DEVICE

CROSS REFERENCE TO RELATED APPLICATIONS

This application claims the benefit of Japanese Priority Patent Application JP 2016-020196 filed Feb. 4, 2016, the entire contents of which are incorporated herein by reference.

TECHNICAL FIELD

The present disclosure relates to a communication device, a communication method, a transmission device and a reception device.

BACKGROUND ART

By utilizing a communication device onboard a moving object such as a vehicle, direct communication between the moving object and various target objects is realized. Communication between a communication device onboard a moving object and various other communication devices is called vehicle-to-X (V2X) communication. For V2X communication, communication systems utilizing dedicated short range communications (DSRC) have been investigated thus far, but recently, investigation into communication systems utilizing mobile phone communication standards such as Long Term Evolution (LTE) is progressing. A system related to the LTE communication standard is disclosed in NPL 1 below, for example.

CITATION LIST

Non Patent Literature

NPL 1: 3GPP TR 22. 885 "Study on LTE support tor Vehicle to Everything (V2X) services"

SUMMARY

Technical Problem

In V2X communication, a communication device carried by a pedestrian, a communication device mounted on a moving object and a communication device installed on the side of a road exchange messages with one another to realize improvement of convenience of transportation and assurance of safety. However, considering that the quantity of power of a communication device carried by a pedestrian is restricted and a communication device mounted on a moving object may move at a high speed and the like, it is desirable that retransmission according to failure of transmission and reception of a message not be performed when possible. Therefore, the present disclosure provides a system capable of achieving successful transmission and reception of messages in V2X communication more reliably.

Solution to Problem

According to a first embodiment, the disclosure is directed to an electronic device including: circuitry configured to receive a signal from at least one of a base station or road side unit (RSU); determine whether the a least one of the base station or RSU support cooperative vehicle-to-X (V2X) communication; and perform cooperative V2X communication with a vehicle-mounted electronic device with support from the at least one of the base station or RSU based on the determination.

According to another exemplary embodiment, the disclosure is directed to a method performed by an electronic device, the method including: receiving a signal from at least one of a base station or road side unit (RSU); determining whether the a least one of the base station or RSU support cooperative vehicle-to-X (V2X) communication; and performing V2X communication with a vehicle-mounted electronic device with support from the at least one of the base station or RSU based on the determination.

According to another exemplary embodiment, the disclosure is directed to a system including: a network device including first circuitry configured to transmit a signal to a terminal device indicating whether the network device supports cooperative vehicleto-X (V2X) transmission of messages from the terminal device to a vehicle-mounted terminal device; receive, from the terminal device, a message intended for the vehicle-mounted terminal device; and perform cooperative V2X communication with the vehicle-mounted terminal device by transmitting the message received from the terminal device to the vehicle-mounted terminal device.

The system may also include the terminal device including second circuitry configured to receive the signal from the network device indicating whether the network device supports cooperative vehicle-to-X (V2X) transmission of messages from the terminal device to the vehicle-mounted terminal device; determine whether the network device supports cooperative vehicle-to-X (V2X) communication; and perform cooperative V2X communication with the vehicle-mounted electronic device with support from the network device based on the determination.

Advantageous Effects of Invention

According to an embodiment of the present disclosure described above, a system capable of achieving successful transmission and reception of messages in V2X communication more reliably is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram for describing an overview of V2X communication.

FIG. 2 is an explanatory diagram for describing a first scenario of V2V communication.

FIG. 3 is an explanatory diagram for describing a second scenario of V2V communication.

FIG. 4 is an explanatory diagram for describing a third scenario of V2V communication.

FIG. 5 is an explanatory diagram for describing a fourth scenario of V2V communication.

FIG. 6 is an explanatory diagram for describing a fifth scenario of V2V communication.

FIG. 7 is an explanatory diagram illustrating a configuration of a wireless communication system according to an embodiment of the present disclosure.

FIG. 8 is a block diagram illustrating an example of a logical configuration of a UE according to the embodiment.

FIG. 9 is a block diagram illustrating an example of a logical configuration of a UE according to the embodiment.

FIG. 10 is a block diagram illustrating an example of a logical configuration of an eNB according to the embodiment.

FIG. 11 is a block diagram illustrating an example of a logical configuration of an RSU according to the embodiment.

FIG. 12 is a flowchart illustrating an example of a processing flow of determining start of V2X communication with support through a transmission device according to the present embodiment.

FIG. 13 is an explanatory diagram of an overview of cooperative transmission according to the present embodiment.

FIG. 14 is a timing diagram of cooperative transmission according to the present embodiment.

FIG. 15 is a timing diagram of cooperative transmission of an independent relay type according to the present embodiment.

FIG. 16 is a timing diagram of cooperative transmission of a controlled relay type according to the present embodiment.

FIG. 17 is a timing diagram of cooperative transmission of a relay type with change according to the present embodiment.

FIG. 18 is a timing diagram of cooperative transmission of a relay type with change according to the present embodiment.

FIG. 19 is an explanatory diagram of an example in which two supporting devices cooperatively transmit messages to a reception device according to the present embodiment.

FIG. 20 is an explanatory diagram of an example in which two supporting devices cooperatively transmit messages to a reception device according to the present embodiment.

FIG. 21 is an explanatory diagram of an example in which message relay is performed between supporting devices according to the present embodiment.

FIG. 22 is an explanatory diagram of an example in which message relay is performed between supporting devices according to the present embodiment.

FIG. 23 is an explanatory diagram of another example of cooperative transmission according to the present embodiment.

FIG. 24 is a flowchart illustrating an example of a cooperative transmission processing flow executed by a transmission device according to the present embodiment.

FIG. 25 is a flowchart illustrating an example of a cooperative transmission processing flow executed by a supporting device according to the present embodiment.

FIG. 26 is a flowchart illustrating an example of a cooperative transmission processing flow executed by a reception device according to the present embodiment.

FIG. 27 is a flowchart illustrating an example of a proxy transmission processing flow executed by a transmission device according to the present embodiment.

FIG. 28 is a flowchart illustrating an example of a Uu multiplex transmission processing flow executed by a transmission device according to the present embodiment.

FIG. 29 is a block diagram illustrating a first example of a schematic configuration of an eNB.

FIG. 30 is a block diagram illustrating a second example of a schematic configuration of an eNB.

FIG. 31 is a block diagram illustrating an example of a schematic configuration of a smartphone.

FIG. 32 is a block diagram illustrating an example of a schematic configuration of a car navigation device.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, multiple structural elements having substantially the same function and structure may in some cases be distinguished by different letters appended to the same sign. For example, multiple elements having substantially the same function and structure or logical significance are distinguished as UEs 10A, 10B, 10C, and so on as necessary. On the other hand, when not particularly distinguishing each of multiple structural elements having substantially the same function and structure, only the same sign will be given. For example, when not particularly distinguishing UEs 10A, 10B, 10C, each of the UEs 10A, 10B, 10C will be designated simply the UE 10.

Hereinafter, a description will be given in the following order.

1. Introduction
1.1. V2X Communication
1.2. Technical Problem
2. Examples of Configuration
2.1. Example of Configuration of System
2.2. Example of Configuration of UE (user equipment)
2.3. Example of Configuration of UE (moving object)
2.4. Example of Configuration of eNB
2.5. Example of Configuration of RSU
3. Technical Features
3.1. Basic Operation
3.2. Cooperative Transmission
3.2.1. Overview
3.2.2. Cooperative Transmission Types
3.2.3. Processing Flows
3.3. Proxy Transmission
3.4. Uu Multiplex Transmission
4. Application Examples
5. Conclusion

1. INTRODUCTION

<1.1. V2X Communication>

By utilizing a communication device onboard a moving object such as a vehicle, direct communication between the moving object and various target objects is realized. Communication between a vehicle and various target objects is called vehicle-to-X (V2X) communication. FIG. 1 is an explanatory diagram for describing an overview of V2X communication. As illustrated in FIG. 1, V2X communication may be vehicleto-vehicle (V2V) communication, vehicle-to-infrastructure (V2I) communication, vehicle-to-pedestrian (V2P) communication, or vehicle-to-home (V2H) communication, for example. In addition, while not illustrated, V2X communication also includes vehicle to nomadic device (V2N) communication, for example. Here, the first character and the third character of V2V communication and the like respectively mean a start point and an end point and do not limit communication paths. For example, V2V communication is the concept including direct communication between moving objects and indirect communication view a base station.

As illustrated in FIG. 1, the communication target of a vehicle in V2V communication may be a passenger vehicle, a commercial or fleet vehicle, an emergency vehicle, or a transit vehicle, for example. Also, the communication target of a vehicle in V2I communication may be a cellular network, a data centre, a fleet or freight management centre, a traffic management centre, a weather service, a rail operation centre, a parking system, or a toll system, for example. Also, the communication target of a vehicle in V2P communication may be a cyclist, a pedestrian shelter, or a motorcycle, for example. Also, the communication target of a vehicle in V2H communication may be a home network, a garage, or enterprise or dealer networks, for example.

Note that in V2X communication, communication systems utilizing dedicated short range communications (DSRC) have been investigated, but recently, investigation into communication systems utilizing mobile phone communication standards such as Long Term Evolution (LTE) is progressing.

Examples of applications of V2X communication include communication systems intended for forward collision warning, loss of control warning, emergency vehicle warning, emergency stop, adaptive cruise assist, traffic condition warning, traffic safety, automatic parking, route deviation warning, message transmission, collision warning, communication range extension, traffic volume optimization, curve speed alert, pedestrian collision warning, or vulnerable person safety. In addition, V2X communication according to user equipment (UE) of a road side unit (RSU) type, minimum QoS of V2X communication, V2X access during roaming, message provision through V2P communication for traffic safety of pedestrians, mixed use for traffic management, improvement of positioning accuracy for traffic participants or the like are investigated.

A list of requirements for the above application examples is shown in the following table 1.

TABLE 1

|  | Effective range | Absolute velocity of UE supporting V2X service | Relative velocity between two UEs supporting V2X service | Maximum tolerable latency | Minimum radio layer message reception reliability (probability that recipient gets it within 100 msec) | Example of cumulative transmission reliability |
|---|---|---|---|---|---|---|
| #1 Suburb | 200 m | 50 kmph | 100 kmph | 100 ms | 90% | 99% |
| #2 Main road | 320 m | 160 kmph | 280 kmph | 100 ms | 80% | 96% |
| #3 Freeway | 320 m | 280 kmph | 280 kmph | 100 ms | 80% | 96% |
| #4 City | 150 m | 50 kmph | 100 kmph | 100 ms | 90% | 99% |
| #5 City intersection | 50 m | 50 kmph | 100 kmph | 100 ms | 95% | — |
| #6 Campus/ commercial district | 50 m | 30 kmph | 30 kmph | 100 ms | 90% | 99% |

To meet the above requirements, standardization of the physical layer of V2X is being investigated in 3GPP. A base technology of V2X communication may be device-to-device (D2D) communication that was standardized in the past in 3GPP. Since D2D communication is communication between terminals without a base station, D2D communication may be considered to aim for extension to V2V communication, V2P communication or part of V2I communication. Such an interface between terminals is called a PC5 interface. For V2I communication or V2N, extension of a previous technology of communication between a base station and a terminal, such as LTE, is being considered. Such an interface between a base station and a terminal is called a Uu interface. In future investigation, it will be necessary to extend the PC5 interface and the Uu interface to meet the above requirements. Main extension points may be, for example, improvement of resource allocation, Doppler frequency measures, establishment of a synchronization method, realization of low power consumption communication, realization of low delay communication and so on.

Various operation scenarios of V2X communication are considered. As an example, examples of operation scenarios of V2V communication will be described with reference to FIGS. 2 to 6.

FIG. 2 is an explanatory diagram for describing a first scenario of V2V communication. In the first scenario, moving objects such as vehicles directly perform V2V communication. A communication link in this case may be called sidelink (SL).

FIG. 3 is an explanatory diagram for describing a second scenario of V2V communication. In the second scenario, moving objects such as vehicles indirectly perform V2V communication via evolved universal terrestrial radio access (E-UTRAN), that is, a base station. A communication link from a transmitting side to the base station is called uplink (UL) and a communication link from the base station to a receiving side is called downlink (DL).

FIG. 4 is an explanatory diagram for describing a third scenario of V2V communication. In the third scenario, a moving object such as a vehicle transmits a signal to other moving objects sequentially through an RSU or a UE of RSU type and E-UTRAN. Communication links between the devices are sequentially called SL, UL and DL.

FIG. 5 is an explanatory diagram for describing a fourth scenario of V2V communication. In the fourth scenario, a moving object such as a vehicle transmits a signal to other moving objects sequentially through E-UTRAN and an RSU or a UE of RSU type. Communication links between the devices are sequentially called UL, DL and SL.

FIG. 6 is an explanatory diagram for describing a fifth scenario of V2V communication. In the fifth scenario, moving objects such as vehicles indirectly perform V2V communication through an RSU or a UE of RSU type. Communication links between the moving objects and the RSU or UE of RSU type are SL.

The above-described scenarios become scenarios of V2P communication when one of the moving objects is changed to a pedestrian. Similarly, the scenarios become scenarios of V2I communication or V2N communication when one of the moving objects is changed to an infrastructure or a network, respectively.

<1.2. Technical Problem>

In V2P communication, communication is performed between a communication device aboard a moving object and a communication device carried by a pedestrian. An example of requirements in V2P communication will be described below. As a relay requirement, delay within 500 ms from a server to a terminal and within 100 ms for end-to-end is considered. As an operation requirement, handling multiple mobile network operators (MNO) is considered. As a power consumption requirement, minimization of battery consumption is considered. As a coverage requirement, coverage of a range in which V2P communication can be performed 4 seconds or longer before collision is considered. For example, in the case of 100 km an hour, coverage having a diameter of approximately 110.8 m or longer corresponding to 27.7 m/s×4 s is necessary. As a message requirement, typically 50 to 300 bytes, and a maximum of 1,200 bytes is considered. As a communication quality requirement, establishment of communication in environments in which a relative speed of a motorcycle and a car is 280 km/h and a relative speed of a pedestrian and a car is 160 km/h is considered.

A technical task of the present disclosure is minimization of battery consumption from among the aforementioned requirements. A smartphone or the like considered as a communication device carried by a pedestrian has insufficient battery capacity in many cases. Accordingly, minimization of battery consumption may be regarded as an important task for introduction of V2P communication.

Here, a communication device carried by a pedestrian has a lower signal transmission frequency than other devices, and thus it is desirable that a receiving side receive signals more reliably. Accordingly, the number of retransmissions is decreased to reduce power consumption of the communication device carried by the pedestrian. Furthermore, a communication device mounted on a moving object may be moved at a high speed, and thus a time lag due to retransmission may cause accidents. Due to such circumstances, the present disclosure provides a system for improving message arrival probability in a reception device by supporting transmission of a transmission device by other communication devices.

2. EXAMPLES OF CONFIGURATION

Hereinafter, examples of a configuration of a wireless communication system according to the present embodiment will be described.

<2.1. Example of Configuration of System>

FIG. 7 is an explanatory diagram illustrating a configuration of a wireless communication system according to an embodiment of the present disclosure. As illustrated in FIG. 7, the wireless communication system according to the embodiment of the present disclosure includes a UE 10, a UE 20, a vehicle 22, an eNB 30, a GNSS satellite 40 and an RSU 50.

The eNB 30 is a cellular base station that provides a cellular communication service to the UE 20 positioned inside a cell. For example, the eNB 30 schedules resources for the UEs 10 and 20 to communicate by, and notifies the UEs 10 and 20 of the scheduled resources. Additionally, the eNB 30 conducts uplink communication or downlink communication with the UEs 10 and 20 in the relevant resources.

The GNSS satellite 40 is an artificial satellite (communication device) that revolves around the earth in a predetermined orbit. The GNSS satellite 40 transmits a global navigation satellite system (GNSS) signal including a navigation message. The navigation message includes various types of information for positioning, such as orbit information and time information of the GNSS satellite 40.

The RSU 50 is a communication device installed on the side of a road. The RSU 50 may perform bi-directional communication with the vehicle 22, the UE 20 aboard the vehicle 22 or the UE 10 carried by a user 12. While the RSU 50 may perform DSRC with the vehicle 22, the UE 20 aboard the vehicle 22 or the UE 10 carried by the user 12, the RSU 50 is assumed to communicate with the vehicle 22, the UE 20 aboard the vehicle 22 or the UE 10 carried by the user 12 through cellular communication system in the present embodiment.

The UE 20 is a communication device that is mounted on the vehicle 22 and moves along with traveling of the vehicle 22. The UE 20 has a function of communicating with the eNB 30 according to control by the eNB 30. In addition, the UE 20 has functions of receiving the GNSS signal transmitted from the GNSS satellite 40 and measuring location information of the UE 20 from the navigation message included in the GNSS signal. Further, the UE 20 has a function of communicating with the RSU 50. Moreover, the UE 20 according to the present embodiment may perform direct communication with the UE 10 carried by the user 12 or the UE 20 aboard another vehicle 22, that is, D2D communication. Hereinafter, the UE 20 and the moving object 22 are collectively called UE 20 if the UE 20 and the moving object 22 may not be distinguished.

The UE 10 is a communication device that is carried by the user 12 and moves along with walking or running of the user 12 or movement of a vehicle (a bus, a motorcycle, a car or the like) that the user 12 is riding. The UE 10 has a function of communicating with the eNB 30 according to control by the eNB 30. In addition, the UE 10 has functions of receiving the GNSS signal transmitted from the GNSS satellite 40 and measuring location information of the UE 10 from the navigation message included in the GNSS signal. Further, the UE 10 has a function of communicating with the RSU 50. Moreover, the UE 10 according to the present embodiment may perform direct communication with another UE 10 or the UE 20, that is, D2D communication. Communication between the UE 10 and the UE 20 is called V2P communication.

Note that although FIG. 7 illustrates the vehicle 22 as an example of a moving object, the moving object is not limited to the vehicle 22. For example, the moving object may also be an object such as a marine vessel, an aircraft, or a bicycle. In addition, although the above describes the UE 20 as including the function of receiving the GNSS signal, the vehicle 22 may have the function of receiving the GNSS signal, and the vehicle 22 may output a GNSS signal reception result to the UE 20.

<2.2. Example of Configuration of UE (User Terminal)>

FIG. 8 is a block diagram illustrating an example of a logical configuration of the UE 10 according to an embodiment of the present disclosure. As illustrated in FIG. 8, the UE 10 according to the present embodiment includes an antenna part 110, a wireless communication unit 120, a GNSS signal processing unit 130, a storage unit 140 and a processing unit 150.

The antenna part 110 radiates a signal output from the wireless communication unit 120 as radio waves to the air. In addition, the antenna part 110 converts radio waves of the space into a signal and outputs the signal to the wireless communication unit 120.

The wireless communication unit 120 transmits and receives signals. For example, the wireless communication unit 120 receives a downlink signal from the eNB 30 and transmits an uplink signal to the eNB 30. Furthermore, the wireless communication unit 120 transmits/receives a sidelink signal to/from another UE 10, the UE 20 or the RSU 50.

The GNSS signal processing unit 130 is a component that processes the GNSS signal transmitted from the GNSS satellite 40. For example, the GNSS signal processing unit 130 measures location information and time information of the UE 10 by processing the GNSS signal.

The storage unit 140 stores programs and various types of data for operations of the UE 10 temporarily or permanently.

The processing unit 150 provides various functions of the UE 10. For example, the processing unit 150 controls communication performed by the wireless communication unit 120.

<2.3. Example of Configuration of UE (Moving Object)>

FIG. 9 is a block diagram illustrating an example of a logical configuration of the UE 20 according to an embodiment of the present disclosure. As illustrated in FIG. 9, the UE 20 according to the present embodiment includes an antenna part 210, a wireless communication unit 220, a GNSS signal processing unit 230, a storage unit 240 and a processing unit 250.

The antenna part 210 radiates a signal output from the wireless communication unit 220 as radio waves to the space. In addition, the antenna part 210 converts radio waves of the space into a signal and outputs the signal to the wireless communication unit 220.

The wireless communication unit 220 transmits and receives signals. For example, the wireless communication unit 220 receives a downlink signal from the eNB 30 and transmits an uplink signal to the eNB 30. Furthermore, the wireless communication unit 220 transmits/receives a side link signal to/from the UE 10, another UE 20 or the RSU 50.

The GNSS signal processing unit 230 is a component that processes the GNSS signal transmitted from the GNSS satellite 40. For example, the GNSS signal processing unit 230 measures location information and time information of the UE 20 by processing the GNSS signal.

The storage unit 240 stores programs and various types of data for operations of the UE 20 temporarily or permanently.

The processing unit 250 provides various functions of the UE 20. For example, the processing unit 250 controls communication performed by the wireless communication unit 220.

<2.4. Example of Configuration of eNB>

FIG. 10 is a block diagram illustrating an example of a logical configuration of the eNB 30 according to an embodiment of the present disclosure. As illustrated in FIG. 10, the eNB 30 according to the present embodiment includes an antenna part 310, a wireless communication unit 320, a network communication unit 330, a storage unit 340 and a processing unit 350.

The antenna part 310 radiates a signal output from the wireless communication unit 320 as radio waves to the space. In addition, the antenna part 310 converts radio waves of the space into a signal and outputs the signal to the wireless communication unit 320.

The wireless communication unit 320 transmits and receives signals. For example, the wireless communication unit 320 receives an uplink signal from the UE 10, the UE 20 or the RSU 50 and transmits a downlink signal to the UE 10, the UE 20 or the RSU 50.

The network communication unit 330 transmits and receives information. For example, the network communication unit 330 transmits information to other nodes and receives information from other nodes. For example, the other nodes include other base stations and a core network node.

The storage unit 340 stores programs and various types of data for operations of the eNB 30 temporarily or permanently.

The processing unit 350 provides various functions of the eNB 30. For example, the processing unit 350 controls communication performed by the UE 10, the UE 20 and the RSU 50 subordinate thereto.

<2.5. Example of Configuration of RSU>

FIG. 11 is a block diagram illustrating an example of a logical configuration of the RSU 50 according to an embodiment of the present disclosure. As illustrated in FIG. 11, the RSU 50 according to the present embodiment includes an antenna part 510, a wireless communication unit 520, a storage unit 530 and a processing unit 540.

The antenna part 510 radiates a signal output from the wireless communication unit 520 as radio waves to the space. In addition, the antenna part 510 converts radio waves of the space into a signal and outputs the signal to the wireless communication unit 520.

The wireless communication unit 520 transmits and receives signals. For example, the wireless communication unit 520 receives a downlink signal from the eNB 30 and transmits an uplink signal to the eNB 30. Furthermore, the wireless communication unit 520 transmits/receives a side link signal to/from the UE 10, the UE 20 or another RSU 50.

The storage unit 530 stores programs and various types of data for operations of the RSU 50 temporarily or permanently.

The processing unit 540 provides various functions of the RSU 50. For example, the processing unit 540 controls communication performed by the wireless communication unit 520.

Configuration examples which are common in embodiments have been described. Next, technical features of the respective embodiments will be described in detail.

3. TECHNICAL FEATURES

The present embodiment provides a system in which transmission by a transmission device is supported by another communication device (referred to hereinafter as a supporting device) to improve message arrival probability in a reception device.

Hereinafter, an example in which a transmission device is the UE 10, a reception device is the UE 20 and the supporting device is the eNB 30 or the RSU 50 will be described. It will be assumed that battery capacity of the UE 10 is restricted in some cases, whereas the eNB 30 or the RSU 50 has sufficient battery capacity or is connected to a power supply. Accordingly, the eNB 30 or the RSU 50 supports transmission by the UE 10 using sufficient power thereof and thus message arrival probability may be improved and power consumption of the UE 10 may be reduced. Meanwhile, there may be a UE type RSU 50 and an eNB type RSU 50. The UE type RSU 50 can operate as a UE, supports a PC5 interface between the RSU 50 and at least another UE and supports a Uu interface between the RSU 50 and the eNB 30. In addition, the eNB type RSU 50 may operate as an eNB 30.

The transmission device, the reception device and the supporting device are not limited to the aforementioned examples. For example, the transmission device may be the UE 20 and the reception device may be the UE 10. Further, both the transmission device and the reception device may be the UE 10 or the UE 20. In addition, the transmission device may be the RSU 50. The supporting device may be the UE 10 or the UE 20, and there may be a plurality of supporting devices.

<3.1. Basic Operation>

The UE 10 performs V2X communication with the support of the eNB 30 or the RSU 50 when the UE 10 receives support of the eNB 30 or the RSU 50 and performs normal V2X communication when the UE 10 does not receive support. The former is referred to as V2X communication with support and the latter is referred to as V2X communication without support.

Accordingly, the UE 10 discovers a neighboring eNB 30 or RSU 50. For example, the UE 10 may discover the RSU 50 through a discovery signal or a physical sidelink broadcast channel (PSBCH) from the RSU 50. Further, the UE 10 may discover the eNB 30 through a physical broadcast channel (PBCH), a physical downlink control channel (PDCCH), a master information block (MIB) or a system information block (SIB) from the eNB 30.

Additionally, the UE 10 checks whether the discovered eNB 30 or RSU 50 supports V2X communication with support. For example, the eNB 30 or the RSU 50 notifies the UE 10 of information indicating that a message may be relayed to the UE 20 by supporting the UE 10 (e.g., cooperating with the UE 10, substituting for the UE 10 or the like). Specifically, a discovery signal or system information (SIB or MIB) may include information indicating whether V2X communication is supported. Accordingly, the UE 10 acquires support information from the discovery signal or system information to perform the aforementioned checking.

The UE 10 performs V2X communication with support when the eNB 30 or the RSU 50 supporting V2X communication with support is confirmed and performs V2X communication without support when the eNB 30 or the RSU 50 supporting V2X communication with support is not confirmed. Such processing flow will be described with reference to FIG. 12.

FIG. 12 is a flowchart illustrating an example of a processing flow of determining start of V2X communication with support performed by a transmission device (e.g., UE 10) according to the present embodiment. As illustrated in FIG. 12, first of all, the UE 10 receives a signal such as a discovery signal, PSBCH, PBCH or PDCCH from the eNB 30 or the RSU 50 (step S102) to attempt to discover the eNB 30 or the RSU 50 (step S104). When the eNB 30 or the RSU 50 has been successfully discovered from the received signal (step S104/YES), the UE 10 determines whether the discovered eNB 30 or RSU 50 supports V2X communication with support by confirming support information included in the discovery signal or system information (step S106). When it is determined that the discovered eNB 30 or RSU 50 supports V2X communication with support (step S106/YES), the UE 10 switches to V2X communication with support (step S108). On the other hand, when discovery of the eNB 30 or RSU 50 from the received signal has failed (step S104/NO), the UE 10 continues V2X communication without support (step S110) and the processing returns to step S102 again. Also, when it is determined that the discovered eNB 30 or RSU 50 does not support V2X communication with support (step S106/NO), the UE 10 continues V2X communication without support (step S110) and the processing returns to step S102 again.

The basic operation of the UE10 has been described. Next, operations of V2X communication with support will be described in detail. As V2X communication with support, three types, cooperative transmission, proxy transmission and Uu multiplex transmission, are considered.

<3.2. Cooperative Transmission>

<3.2.1. Overview>

The present communication method is a method through which a transmission device (e.g., UE 10) and a supporting device (e.g., RSU 50) cooperatively transmit messages to a reception device (e.g., UE 20).

The present communication method may be regarded as an extension of coordinated multi-point transmission/reception (CoMP) technology in which base stations cooperatively transmit messages in LTE through V2X communication. A first difference between CoMP in LTE and the present communication method is that base stations cooperate or the UE 10 and the supporting device cooperate. A second difference from LTE is that, in V2X communication, a transmission device performs repetitive transmission multiple times for each message in order to improve message arrival probability. Accordingly, the supporting device acquires a message to be cooperatively transmitted in the initial period of repetitive transmission of the transmission device and transmits the acquired message in the remaining period of repetitive transmission.

The supporting device according to the present embodiment transmits a message, transmitted from the transmission device to the reception device using V2X communication, to the reception device in cooperation with the transmission device. In addition, the transmission device according to the present embodiment transmits control information (cooperative transmission parameters which will be described below) for causing the reception device to synthesize a message transmitted by the supporting device using V2X communication and a message transmitted by the transmission device using V2X communication to the reception device or the supporting device. Furthermore, the reception device according to the present embodiment synthesizes the message transmitted by the transmission device using V2X communication and the message transmitted from the supporting device that transmits messages in cooperation with the transmission device on the basis of the received control information. In this way, received messages may be synthesized in the reception device and thus reception quality (e.g., a signal-to-interference-plus-noise ratio (SINR)) is enhanced and message arrival probability is improved.

The present communication method will be described in detail with reference to FIGS. 13 and 14.

FIG. 13 is an explanatory diagram of an overview of cooperative transmission according to the present embodiment. As illustrated in FIG. 13, the UE 10 transmits a message to the UE 20 mounted in a moving object 22. The UE 10 performs repetitive transmission multiple times for each message. Since a recipient is the UE 20, the UE 10 transmits a message using a PC5 interface. Accordingly, this message may be received by the RSU 50 having the PC5 interface, as illustrated in FIG. 13. The RSU 50 relays the received message to the UE 20 corresponding to the recipient. The UE 20 synthesizes the direct message received from the UE 10 and the relay message relayed by the RSU 50. Accordingly, reception quality is enhanced and message arrival probability is improved.

FIG. 14 is a timing diagram of cooperative transmission according to the present embodiment. In the figure, "Pedestrian Tx" indicates a message transmitted by the UE 10. "RSU Tx/Rx" indicates a message transmitted or received by the RSU 50. "Vehicle Rx" represents a message received by the UE 20. As illustrated in FIG. 14, the UE 10 transmits a message with a redundancy version (RV) of 0. This message is received by each of the UE 20 and the RSU 50, Subsequently, the RSU 50 transmits (i.e., relays) the received message to the UE 20 as it is. This message is received by the UE 20. Additionally, the UE 20 synthesizes the received messages. In FIG. 14, a message retransmitted (repeatedly transmitted) by the UE 10 is omitted. For example, timing of relay by the RSU 50 may be identical to timing of retransmission by the UE 10.

There may be a plurality of types of cooperative transmission. Examples include relay type without change, relay type with change, interface-changing relay type and the like. These types will be described in detail.

<3.2.2. Cooperative Transmission Types>

(1) Relay Type without Change

For example, a supporting device may relay a received message without changing the RV of the received message.

(1.1) Independent Relay Type

A supporting device may transmit a message independently of a transmission device. In this case, a reception device performs a reception operation in two resources, that is, a resource for reception from the transmission device and a resource for reception from the supporting device. An overview of cooperative transmission with respect to the independent relay type will be described with reference to FIG. 15.

FIG. 15 is a timing diagram of independent relay type cooperative transmission according to the present embodiment. In the figure, "Pedestrian Tx" denotes a message transmitted by the UE 10. "RSU Tx/Rx" denotes a message transmitted or received by the RSU 50. "Vehicle Rx" represents a message received by the UE 20. As illustrated in FIG. 15, the UE 10 transmits a message with an RV of 0 and a physical sidelink control channel (PSCCH). The message and the PSCCH are received by each of the UE 20 and the RSU 50. Subsequently, the RSU 50 relays the message to the UE 20 without changing the RV on the basis of the received PSCCH. Here, the RSU 50 also transmits the PSCCH to the UE 20. The message and PSCCH are received by the UE 20. Additionally, the UE 20 synthesizes the received respective messages with reference to the received respective PSCCHs. Although FIG. 15 shows that the PSCCH and data signal are transmitted and received in different time resources, the PSCCH and data signal may be transmitted and received in the same or overlapping time resources. This is the same in other timing diagrams. Furthermore, in FIG. 15, a message retransmitted (i.e., repeatedly transmitted) by the UE 10 is omitted. For example, timing of relay by the RSU 50 may be identical to timing of retransmission by the UE 10.

As illustrated in FIG. 15, the UE 10 notifies the UE 20 and the RSU 50 of the PSCCH. The PSCCH includes parameters (i.e., control information) regarding cooperative transmission. The RSU 50 relays the message to the UE 20 on the basis of the parameters received from the UE 10. Further, the RSU 50 notifies the UE 20 of the PSCCH including the parameters regarding cooperative transmission. The UE 20 synthesizes messages on the basis of the parameters. The parameters regarding cooperative transmission are referred to as cooperative transmission parameters hereinafter. The cooperative transmission parameters notified of by the UE 10 and the cooperative transmission parameters notified of by the RSU 50 may be identical or different. An example of information that may be included in the cooperative transmission parameters notified of by the UE 10 will be described.

Cooperative Transmission Parameters Notified of by Transmission Device

For example, the cooperative transmission parameters may include a CoMP indicator indicating whether cooperation between a transmission device and a supporting device is implemented (i.e., whether the implementation is required). Accordingly, the reception device and the supporting device may be notified of whether cooperative transmission is performed.

In addition, the cooperative parameters may include a CoMP type that indicates the type of cooperation between the transmission device and the supporting device. In addition to the relay type without change, the relay type with change and the interface-changing relay type, the cooperative transmission type may be the number of supporting devices involved in cooperative transmission, a synthesis method in a reception device or the like.

Furthermore, the cooperative transmission parameters may include a transmission device ID that indicates identification information of the transmission device. Moreover, the cooperative transmission parameters may include a reception device ID that indicates identification information of the reception device. The cooperative transmission parameters may include a reception device group ID in addition to or instead of the reception device ID.

In addition, the cooperative transmission parameters may include RV information (RV value and/or RV pattern) of a target message of cooperative transmission.

The cooperative transmission parameters may include the number of repetitive transmissions of the target message of cooperative transmission. Accordingly, the supporting device may determine whether support of V2X communication is possible. For example, if the number of repetitive transmissions does not reach a maximum value, it may be determined that the supporting device may perform relay at a remaining repetitive transmission timing of the transmission device.

In addition, the cooperative transmission parameters may include a message ID or a packet ID that indicates identification information of the target message of cooperative transmission.

Furthermore, the cooperative transmission parameters may include modulation and coding scheme (MCS) information.

The cooperative transmission parameters may include timing advance (TA) information. The RSU 50 may appropriately control relay timing with reference to the TA information.

The cooperative transmission parameters may include frequency hopping indicator information. The supporting device may appropriately control frequency resources used for relay with reference to the frequency hopping indicator.

The cooperative transmission parameters notified of by the transmission device have been described. The supporting device sets radio resources used for transmission of messages on the basis of the cooperative transmission parameters. The supporting device may control radio resources used for relaying messages by itself, and thus may appropriately set radio resources, for example, depending on the communication state thereof. Next, the cooperative transmission parameters notified of by the supporting device will be described.

Cooperative Transmission Parameters Notified of by Supporting Device

The cooperative transmission parameters may include information indicating that a message transmitted by the supporting device is a relay of a message received from the transmission device. The reception device may synthesize messages on the basis of this information. Furthermore, the cooperative transmission parameters notified of by the supporting device may include the same information as the aforementioned cooperative transmission parameters notified of by the transmission device. For example, when a PSCCH includes a message ID or a packet ID in the cooperative transmission parameters notified of by the supporting device, the reception device may synthesize messages to which the same message ID or packet ID is attached, respectively received from the transmission device and the supporting device.

Examples of the cooperative transmission parameters have been described. The cooperative transmission parameters may be included in a PSCCH and notified of. Further, the cooperative transmission parameters may be distributed to a PSCCH and a physical sidelink shared channel (PSSCH) and included therein. For example, cooperative transmission parameters other than the cooperative transmission indicator may be included in the PSSCH, and the cooperative transmission indicator and information indicating a region on the PSSCH in which other cooperative transmission parameters are included may be included in the PSCCH.

(1.2) Controlled Relay Type

The supporting device may transmit a message on the basis of control by the transmission device. In this case, information indicating radio resources intended to be used by the supporting device for relaying is included in cooperative transmission parameters of which the supporting device is notified by the transmission device. Accordingly, the reception device may receive a message from the transmission device and a message from the supporting device in the same resources according to the cooperative transmission parameters. An overview of cooperative transmission of the controlled relay type will be described with reference to FIG. 16.

FIG. 16 is a timing diagram of cooperative transmission of the controlled relay type according to the present embodiment. In the figure, "Pedestrian Tx" denotes a message transmitted by the UE 10. "RSU Tx/Rx" denotes a message transmitted or received by the RSU 50. "Vehicle Rx" represents a message received by the UE 20. As illustrated in FIG. 16, the UE 10 transmits a message with an RV of 0 and a PSCCH. The message and PSCCH are received by each of the UE 20 and the RSU 50. Then, the RSU 50 relays the message to the UE 20 without changing the RV on the basis of cooperative transmission parameters included in the received PSCCH. Additionally, the UE 20 synthesizes the respective messages with reference to the PSCCH received from the UE 10. In FIG. 16, a message retransmitted (i.e., repeatedly transmitted) by the UE 10 is omitted. For example, timing of relay by the RSU 50 may be the same as timing of retransmission by the UE 10.

Cooperative transmission parameters notified of by the transmission device will be described. Cooperative transmission parameters in cooperative transmission of this type may include the same information as the aforementioned independent relay type. Accordingly, an example of information that may be further included in the cooperative transmission parameters in cooperative transmission of this type will be described.

For example, the cooperative transmission parameters may include information that indicates radio resources intended to be used for transmission to the reception device. Specifically, the cooperative transmission parameters may include resource pool information for relay. Further, the cooperative transmission parameters may include resource pattern of transmission (RPT) information for relay. Here, it is desirable that RPT for relay have delayed time compared to normal RPT. In addition, the cooperative transmission parameters may include frequency band information for relay. The supporting device may use radio resources designated by the transmission device to relay a message with reference to such information. Accordingly, the reception device may receive the message from the transmission device and the message from the supporting device in the same resources.

The cooperative transmission parameters have been described. The cooperative transmission parameters may be included in a PSCCH and notified of or distributed to a PSCCH and a PSSCH and included therein.

(2) Relay Type with Change

For example, the supporting device may change the RV of a message transmitted from the transmission device and relay the message to the reception device.

Specifically, the supporting device may randomly change the RV and relay the message. In addition, the supporting device may change the RV on the basis of cooperative transmission parameters and relay the message. In this case, the supporting device may assign the same RV as the transmission device to a message transmitted at the same timing as transmission by the transmission device. An overview of cooperative transmission of the relay type with change will be described with reference to FIGS. 17 and 18.

FIGS. 17 and 18 are timing diagrams of cooperative transmission of the relay type with change according to the present embodiment. FIG. 17 shows a case in which the RSU 50 succeeds in the first reception and FIG. 18 shows a case in which the RSU 50 fails in the first reception and succeeds in the second reception. In the figure, "Pedestrian Tx" denotes a message transmitted by the UE 10. "RSU Tx/Rx" denotes a message transmitted or received by the RSU 50. "Vehicle Rx" represents a message received by the UE 20.

As illustrated in FIG. 17, the UE 10 transmits a message with an RV of 0 and a PSCCH. The message and the PSCCH are received by each of the UE 20 and the RSU 50. Then, the UE 10 retransmits (i.e., repeatedly transmits) a message with an RV of 2. On the other hand, the RSU 50 changes the RV and relays the message to the UE 20 on the basis of cooperative transmission parameters included in the received PSCCH. Here, the RSU 50 changes the RV to 2 like the message retransmitted by the UE 10 and relays the message in the same resources (e.g., time and frequency) as those of retransmission by the RU 10. Accordingly, the UE 20 may receive messages with the same RV in the same resources from the UE 10 and the RSU 50. Additionally, the UE 20 synthesizes the message with the RV of 2 and the previously received message with the RV of 0 with reference to the PSCCH received from the UE 10.

As illustrated in FIG. 18, the UE 10 transmits a message with an RV of 0 and a PSCCH. The message and the PSCCH are received by each of the UE 20 and the RSU 50. Thereafter, the UE 10 retransmits (i.e., repeatedly transmits) a message with an RV of 2 and then a message with an RV of 1. On the other hand, the RSU 50 fails to decode the message with the RV of 0 alone and successfully decodes the message by synthesizing the message with the message with the RV of 2. In this case, the RSU 50 changes the RV of the message acquired through synthesis and relays the message to the UE 20. Here, the RSU 50 changes the RV to 1 like the message subsequently retransmitted by the UE 10 and relays the message in the same resources (e.g., time and frequency)

as those of retransmission by the UE 10. Accordingly, the UE 20 may receive messages having the same RV from the UE 10 and the RSU 50 in the same resources. Additionally, the UE 20 synthesizes the messages with the RVs of 0, 1 and 2 with reference to the PSCCH received from the UE 10.

(3) Interface-Changing Relay Type

The supporting device may relay a message transmitted from the transmission device through a PC5 interface to the reception device through the PC5 interface. Further, the supporting device may relay a message transmitted from the transmission device through the PC5 interface to the reception device through a Uu interface. In the latter case, the supporting device may be an eNB type RSU 50. Furthermore, in the latter case, relay of a message from the RSU 50 to the eNB 30 and then transmission of the message from the eNB 30 to the reception device through the Uu interface may be considered, for example.

For example, the supporting device may change an interface and relay a message on the basis of cooperative transmission parameters included in a PSCCH notified of by the transmission device. An example of information that may be included in cooperative transmission parameters in cooperative transmission of this type will be described.

For example, the cooperative transmission parameters may include a cooperative transmission indicator, a cooperative transmission type, a transmission device ID, a reception device ID (and/or a reception device group ID), RV information (RV value and/or RV pattern), the number of repetitive transmissions and/or a message ID or a packet ID. Furthermore, the cooperative transmission messages may include information indicating a relay period (i.e. transmission period) that represents a period in which relay (i.e., transmission) will be performed. The information indicating the relay period is included in the cooperative transmission parameters and thus relay may be performed within the period.

(4) Other Relay Types

For example, a plurality of supporting devices may be involved in cooperative transmission. Cooperative transmission in which a plurality of supporting devices are involved will be described with reference to FIGS. 19 to 22.

FIGS. 19 and 20 are explanatory diagrams of examples in which two supporting devices cooperatively transmit messages to a reception device.

As illustrated in FIG. 19, a message transmitted by the UE 10 through a PC5 interface is received by an RSU 50A (eNB type) and an RSU 50B other than the UE 20. Then, the RSU 50A and the RSU 50B relay the received messages to the UE 20. During relay, the RSU 50A may use a Uu interface.

In FIG. 20, "Pedestrian Tx" denotes a message transmitted by the UE 10. "RSU Tx/Rx" denotes a message transmitted or received by the RSU 50B. "eNB Tx/Rx" represents a message transmitted or received by the RSU 50A. "Vehicle Rx" represents a message received by the UE 20. As illustrated in FIG. 20, the UE 10 transmits a message with an RV of 0. This message is received by each of the UE 20, the RSU 50A and the RSU 50B. Then, the RSUs 50A and 50B transmit (i.e., relay) the received messages to the UE 20. These messages are received by the UE 20. The UE 20 synthesizes the received messages. In FIG. 20, a message retransmitted (i.e. repetitively transmitted) by the UE 10 is omitted. For example, timing of relay by the RSUs 50A and 50B may be identical to timing of retransmission by the UE 10.

FIGS. 21 and 22 are explanatory diagrams of examples in which a message is relayed between supporting devices.

In the example illustrated in FIG. 21, a message transmitted by the UE 10 through a PC5 interface is received by the RSU 50A (eNB type) in addition to the UE 20. Then, the RSU 50A relays the received message to the RSU 50B. In this case, the RSU 50A corresponds to a relay device and the RSU 50B relays the message received from the RSU 50A to the UE 20.

In the example illustrated in FIG. 22, a message transmitted by the UE 10 through a PC5 interface is received by the RSU 50B in addition to the UE 20. Then, the RSU 50B relays the received message to the RSU 50A (eNB type). In this case, the RSU 50B corresponds to a relay device and the RSU 50A relays the message received from the RSU 50B to the UE 20. A Uu interface may be used for relay by the RSU 50A. In addition, an eNB 30 may perform relay instead of the RSU 50A.

Cooperative transmission in which a plurality of supporting devices are involved has been described. Even when a plurality of supporting devices are involved, the technical features of cases in which one supporting device is involved, described above in detail, are equally applicable. For example, a plurality of involved supporting devices may perform relay independently from the transmission device or perform relay under the control of the transmission device.

(5) Modification Examples

While examples in which the UE 10 cooperates with the eNB 30 or the RSU 50 have been described, the present technology is not limited to these examples. For example, RSUs 50 may cooperate with each other. Such a case will be described in detail with reference to FIG. 23.

FIG. 23 is an explanatory diagram of another example of cooperative transmission according to the present embodiment. As illustrated in FIG. 23, an RSU 50A and an RSU 50B cooperatively transmit messages to the UE 10 or the UE 20. In this case, one of the RSU 50A and the RSU 50B is a transmission device and the other is a supporting device. In addition, the UE 10 or the UE 20 is a reception device. When the UE 10 is the reception device, the messages are called I2P messages. When the UE 20 is the reception device, the messages are called I2V messages.

The RSU 50A and the RSU 50B may perform I2I communication wirelessly or by wire. An interface in a wireless case is called a PC5 interface and an interface in a wired case is called an X2 interface. In addition, the eNB 30 may perform communication through a Uu interface or an X2 interface between the RSU 50A and the RSU 50B and controls the RSU 50A and the RSU 50B, for example.

The transmission device may notify the supporting device of cooperative transmission parameters using a PC5 interface or an X2 interface between RSUs 50. Furthermore, the transmission device may notify the supporting device of the cooperative transmission parameters using a Uu interface or an X2 interface with the eNB 30, that is, via the eNB 30. In addition, the eNB 30 may set the cooperative transmission parameters and the transmission device and the supporting device may be notified of the cooperative transmission parameters through the Uu interface or the X2 interface.

The cooperative transmission parameters according to the present modification example may include the same information as the aforementioned information. Of course, the cooperative transmission parameters according to the present embodiment may include various types of information in addition to or instead of the aforementioned information. An example of information that may be included in the cooperative transmission parameters according to the present modification example will be described.

For example, the cooperative transmission parameters may include resource information indicating radio resources intended to be used for cooperative transmission.

In addition, the cooperative transmission parameters may include timing information indicating timing at which cooperative transmission is performed.

Furthermore, the cooperative transmission parameters may include target UE information indicating a reception device (e.g., the UE 10 or the UE 20) that is a target of cooperative transmission.

Moreover, the cooperative transmission parameters may include data that is a target of cooperative transmission or information indicating the data that is a target of cooperative transmission.

The cooperative transmission parameters according to the present embodiment have been described. The supporting device performs cooperative transmission of messages on the basis of these cooperative transmission parameters.

<3.2.3. Processing Flows>

Examples of processing flows related to cooperative transmission will be described with reference to FIGS. 24 to 26.

FIG. 24 is a flowchart illustrating an example of a cooperative transmission processing flow executed by a transmission device (e.g., UE 10) according to the present embodiment. As illustrated in FIG. 24, the UE 10 selects a cooperative transmission type (step S202). Cooperative transmission types include the aforementioned relay type without change, relay type with change, interface-changing relay type and the like, for example. The UE 10 selects any one of such cooperative transmission types. Then, the UE 10 transmits a PSCCH and a PSSCH including cooperative transmission parameters using a PC5 interface (steps S204 and S206).

FIG. 25 is a flowchart illustrating an example of a cooperative transmission processing flow executed by a supporting device (e.g., RSU 50) according to the present embodiment. As illustrated in FIG. 25, first of all, the RSU 50 decodes a PSCCH received from a transmission device (e.g., UE 10) (step S302). Then, the RSU 50 determines whether a cooperative transmission indicator is valid (step S304). When it is determined that the cooperative transmission indicator is not valid (step S304/NO), the processing is ended. On the other hand, when it is determined that the cooperative transmission indicator is valid (step S304/YES), the RSU 50 checks the cooperative transmission type (step S306). Next, the RSU 50 decodes a PSSCH received from the transmission device (step S308). Additionally, the RSU 50 relays a decoded message to the UE 20 depending on the cooperative transmission type (step S310). For example, when the cooperative transmission type is the relay type without change, the RSU 50 transmits the message through a PC5 interface according to cooperative transmission parameters notified of through the PSCCH. For example, if the cooperative transmission type is the relay type with change, the RSU 50 changes the RV and transmits the message through the PC5 interface according to the cooperative transmission parameters notified of through the PSCCH. For example, if the cooperative transmission type is the interface-changing relay type, the RSU 50 transmits the message through a Uu interface according to the cooperative transmission parameters notified of through the PSCCH.

FIG. 26 is a flowchart illustrating an example of a reception processing flow executed by a reception device (e.g., UE 20) according to the present embodiment. As illustrated in FIG. 26, first of all, the UE 20 decodes a PSCCH received from a transmission device (e.g., UE 10) (step S402). Then, the UE 20 determines whether a cooperative transmission indicator is valid (step S404). When it is determined that the cooperative transmission indicator is not valid (step S404/NO), the UE 20 decodes a PSSCH received from the transmission device (step S406). On the other hand, when it is determined that the cooperative transmission indicator is valid (step S404/YES), the UE 20 checks the cooperative transmission type (step S408). Next, the UE 20 decodes the PSSCH received from the transmission device (step S410) and decodes a PSSCH received from a supporting device (e.g., RSU 50) (step S412). Additionally, the UE 20 synthesizes packets obtained by decoding the respective PSSCHs (step S414).

<3.3. Proxy Transmission>

This communication method is a method through which a supporting device (e.g., RSU 50) transmits a message to a reception device (e.g., UE 20) on behalf of a transmission device (e.g., UE 10).

The supporting device according to the present embodiment transmits a message, transmitted from the transmission device to the reception device using V2X communication, to the reception device on behalf of the transmission device. In addition, the transmission device according to the present embodiment transmits control information (proxy transmission parameters which will be described below) for causing the supporting device to transmit a message using V2X communication on behalf of the transmission device to the reception device or the supporting device. Furthermore, the reception device according to the present embodiment receives the message transmitted by the supporting device on behalf of the transmission device using V2X communication. In this way, proxy transmission using sufficient power of the supporting device is realized, and thus reception quality of enhanced and message arrival probability is improved. Furthermore, the transmission device may reduce the number of repetitive transmissions according to proxy transmission of the supporting device, and thus power consumption may be reduced.

For example, the transmission device may notify the supporting device of parameters (i.e., control information) for proxy transmission. The supporting device relays a message to the reception device on the basis of the parameters received from the transmission device. Such parameters may be referred to as proxy transmission parameters hereinafter. An example of information included in the proxy transmission parameters will be described.

Proxy Transmission Parameters

For example, the proxy transmission parameters may include a proxy transmission indicator indicating whether the supporting device performs proxy transmission (i.e. requests the performance). Accordingly, the reception device and the supporting device may recognize whether proxy transmission is performed.

Furthermore, the proxy transmission parameters may include a transmission device ID indicating identification information of a transmission device. In addition, the proxy transmission parameters may include a reception device ID indicating identification information of a reception device. The proxy transmission parameters may include a reception device group ID in addition to or instead of the reception device ID.

Additionally, the proxy transmission parameters may include RV information (RV value and/or RV pattern) of a target message of proxy transmission.

The proxy transmission parameters may include the number of repetitive transmissions of the target message of proxy transmission. Accordingly, the supporting device may determine whether V2X communication can be supported. For example, if the number of repetitive transmissions does not reach a maximum value, it may be determined that proxy transmission by the supporting device can be performed at a remaining repetitive transmission timing of the transmission device.

Furthermore, the proxy transmission parameters may include a message ID or a packet ID that indicates identification information of the target message of proxy transmission.

In addition, the proxy transmission parameters may include MCS information.

The proxy transmission parameters may include TA information. The supporting device may control relay timing when possible with reference to the TA information.

Moreover, the proxy transmission parameters may include frequency hopping indicator information. The supporting device may appropriately control frequency resources used for relay with reference to the frequency hopping indicator.

The proxy transmission parameters may include information indicating a relay period that represents the time until relay (i.e., transmission) is performed.

The proxy transmission parameters have been described. The proxy transmission parameters may be included in a PSCCH and notified of. Further, the proxy transmission parameters may be distributed to a PSCCH and a PSSCH and included therein. For example, proxy transmission parameters other than the proxy transmission indicator may be included in the PSSCH and the proxy transmission indicator and information indicating a region on the PSSCH in which other proxy transmission parameters are included may be included in the PSCCH.

Reporting

The transmission device may stop repetitive transmission when the supporting device performs proxy transmission. For example, when the supporting device succeeds in reception of proxy transmission parameters and executes proxy transmission, the supporting device reports execution of proxy transmission to the transmission device. The transmission device stops repetitive transmission when the transmission device receives the report.

When proxy transmission is completed, that is, transmissions corresponding to a designated number of repetitive transmissions are completed, the supporting device may report completion of proxy transmission to the transmission device. In addition, when proxy transmission is not completed, the supporting device may report it to the transmission device.

Processing Flow

A processing flow related to proxy transmission will be described with reference to FIG. 27.

FIG. 27 is a flowchart illustrating an example of a proxy transmission processing flow executed by a transmission device (e.g., UE 10) according to the present embodiment. As illustrated in FIG. 27, first of all, the UE 10 transmits a message in a proxy transmission mode (step S502). Here, the UE 10 may transmit a PSCCH including proxy transmission parameters along with the message. Then, the UE 10 determines whether a report indicating that proxy transmission is performed has been received from the RSU 50 (step S504). When it is determined that the report has not been received (step S504/NO), the UE 10 continues repetitive transmission of messages (step S506). On the other hand, when it is determined that the report has been received (step S504/YES), the UE 10 stops repetitive transmission of messages (step S508).

<3.4. Uu Multiplex Transmission>

This communication method is a method through which a transmission device (e.g., UE 10) transmits V2X traffic intended to be transmitted to a reception device (e.g., UE 20) through V2X communication, using a Uu interface instead of a PC5 interface to receive support of a supporting device (e.g., eNB 30).

The transmission device according to the present embodiment multiplexes traffic transmitted using V2X communication (referred to hereinafter as V2X traffic) into traffic transmitted through the Uu interface (referred to hereinafter as Uu traffic) and transmits the Uu traffic to the supporting device through the Uu interface. In addition, the transmission device transmits control information (Uu multiplex transmission parameters) related to multiplexing through the Uu interface to the supporting device. The supporting device according to the present embodiment transmits V2X traffic, received through the Uu interface and to be transmitted from the transmission device to the reception device using V2X communication, to the reception device in cooperation with the transmission device or on behalf of the transmission device. The reception device according to the present embodiment receives the V2X traffic transmitted from the supporting device in cooperation with the transmission device or on behalf of the transmission device. In this way, cooperative transmission or proxy transmission is realized using sufficient power of the supporting device, and thus reception quality is enhanced and message arrival probability is improved. Furthermore, the transmission device may decrease the number of repetitive transmissions according to cooperative transmission or proxy communication by the supporting device, and thus power consumption may be reduced. In addition, the transmission device may decrease power consumption more than in a case in which a PC interface is used when a cell is small by using the Uu interface instead of the PC interface.

For example, the transmission device may notify the supporting device of parameters (i.e., control information) for Uu multiplex communication. The supporting device relays multiplexed V2X traffic to the reception device on the basis of the parameters received from the transmission device. Such parameters may be referred to hereinafter as multiplex transmission parameters. An example of information included in the Uu multiplex transmission parameters will be described.

Uu Multiplex Transmission Parameters

For example, the Uu multiplex transmission parameters may include a Uu multiplex transmission indicator indicating whether the transmission device transmits V2X traffic through the Uu interface. Accordingly, the reception device and the supporting device may recognize whether Uu multiplex transmission is performed.

In addition, the Uu multiplex transmission parameters may include Uu multiplex region information indicating a region (e.g., frequency resources or time resources) to which V2X traffic is multiplexed in a signal transmitted using the Uu interface. Accordingly, the supporting device may appropriately acquire V2X traffic.

Furthermore, the Uu multiplex transmission parameters may include a Uu multiplex transmission validity period indicating a period in which multiplex transmission is performed via the Uu interface.

The Uu multiplex transmission parameters may include identification information of the transmission device. The identification information of the transmission device may be location information of the transmission device, a lane ID, an area ID or the like, for example.

In addition, the Uu multiplex transmission parameters may include channel measurement information indicating a result of measurement by the transmission device.

The Uu multiplex transmission parameters may include a reception device ID indicating identification information of the reception device. The Uu multiplex transmission parameters may include a reception device group ID in addition to or instead of the reception device ID.

Further, the Uu multiplex transmission parameters may include RV information (RV value and/or RV pattern) of a target message of Uu multiplex transmission.

In addition, the Uu multiplex transmission parameters may include the number of repetitive transmissions of the target message of Uu multiplex transmission. Accordingly, the supporting device may determine whether V2X communication can be supported. For example, if the number of repetitive transmission does not reach a maximum value, it may be possible to determine whether Uu multiplex transmission by the supporting device can be performed at a remaining repetitive transmission timing of the transmission device.

Furthermore, the Uu multiplex transmission parameters may include a message ID or a packet ID that indicates identification information of the target message of Uu multiplex transmission.

In addition, the Uu multiplex transmission parameters may include information indicating a relay period (i.e., transmission period) that represents a period in which relay (i.e. transmission) is destined to be performed.

Examples of the Uu multiplex transmission parameters have been described. The Uu multiplex transmission parameters may be included in uplink control information (UCI) and notified of. Further, the Uu multiplex transmission parameters may be distributed to UCI and a physical uplink shared channel (PUSCH), for example, and included therein. For example, Uu multiplex transmission parameters other than the Uu multiplex transmission indicator and the Uu multiplex region information may be included in the PUSCH and the Uu multiplex transmission indicator and the Uu multiplex region information may be included in the UCI. In this case, the Uu multiplex region information indicates a region in which Uu multiplex transmission parameters other than the Uu multiplex transmission indicator and the Uu multiplex region information are included in addition to V2X traffic.

Reporting

When proxy transmission or cooperative transmission is completed, that is, transmissions corresponding to a designated number of repetitive transmissions are completed, the supporting device may report completion of proxy transmission or cooperative transmission to the transmission device. In addition, when proxy transmission or cooperative transmission is not completed, the supporting device may report it to the transmission device. Such reporting may be performed using downlink control information (DCI) or a physical hybrid-ARQ indicator channel (PHICH), for example.

Processing Flow

A processing flow related to Uu multiplex transmission will be described with reference to FIG. 28.

FIG. 28 is a flowchart illustrating an example of a Uu multiplex transmission processing flow executed by a transmission device (e.g., UE 10) according to the present embodiment. As illustrated in FIG. 28, first of all, V2X traffic is generated in the UE 10 (step S602). Then, the UE 10 determines whether there is Uu traffic (step S604). When it is determined that there is Uu traffic (step S604/YES), the UE 10 determines whether a period from scheduling request transmission to scheduling grant reception through the Uu interface is within a V2X message period (step S606). When it is determined that the period is within the V2X message period (step S606/YES), the UE 10 performs Uu multiplex transmission of multiplexing V2X traffic and Uu traffic and transmitting the multiplexed V2X traffic and Uu traffic through the Uu interface (step S608). On the other hand, when it is determined that there is no Uu traffic (step S604/NO) or when it is determined that the period is not within the V2X message time period (step S606/NO), the UE 10 transmits the V2X traffic through the PC5 interface (step S610).

4. APPLICATION EXAMPLES

The technology of the present disclosure is applicable to various products. For example, the eNB 30 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the eNB may be realized as any other types of base stations such as a NodeB and a base transceiver station (BTS). The eNB may include a main body (that is also referred to as a base station device) configured to control wireless communication, and one or more remote radio heads (RRH) disposed in a different place from the main body. Additionally, various types of terminals to be discussed later may also operate as the eNB by temporarily or semi-permanently executing a base station function. Furthermore, at least part of components of the eNB 30 may be realized in a base station device or a module for the base station device.

For example, the UEs 10 and 20, or the RUS 50 may be realized as a mobile terminal such as a smartphone, a tablet personal computer (PC), a notebook PC, a portable game terminal, a portable/dongle type mobile router, and a digital camera, or an in-vehicle terminal such as a car navigation device. The UEs 10 and 20, or the RUS 50 may also be realized as a terminal (that is also referred to as a machine type communication (MTC) terminal) that performs machine-to-machine (M2M) communication. Furthermore, the at least some of these structural elements of the UEs 10 and 20, or the RSU 50 may be realized in a module (such as an integrated circuit module including a single die) mounted on each of the terminals.

<4-1. Application Examples Regarding eNB>

First Application Example

FIG. 29 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 29. For example, the multiple antennas 810 may be compatible with multiple frequency bands used by the eNB 800. Although FIG. 29 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 29. For example, the multiple BB processors 826 may be compatible with multiple frequency bands used by the eNB 800. The wireless communication interface 825 may include the multiple RF circuits 827, as illustrated in FIG. 29. For example, the multiple RF circuits 827 may be compatible with multiple antenna elements. Although FIG. 29 illustrates the example in which the wireless communication interface 825 includes the multiple BB processors 826 and the multiple RF circuits 827, the wireless communication interface 825 may also include a single BB processor 826 or a single RF circuit 827.

In the eNB 800 illustrated in FIG. 29, the processing unit 350 described with reference to FIG. 10 may be mounted in the wireless communication interface 825 (e.g., BB processor 826) or controller 821. Furthermore, the wireless communication unit 320 may be mounted in the wireless communication interface 825 (e.g., RF circuit 827). The antenna part 310 may be mounted in the antenna 810. The network communication unit 330 may be mounted in the controller 821 and/or the network interface 823. In addition, the storage unit 340 may be mounted in the memory 822.

Second Application Example

FIG. 30 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 30. For example, the multiple antennas 840 may be compatible with multiple frequency bands used by the eNB 830. Although FIG. 30 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 29.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 29, except the BB processor 856 is connected to the RF circuit 864 of the RRH 860 via the connection interface 857. The wireless communication interface 855 may include the multiple BB processors 856, as illustrated in FIG. 30. For example, the multiple BB processors 856 may be compatible with multiple frequency bands used by the eNB 830. Although FIG. 30 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 30. For example, the multiple RF circuits 864 may support multiple antenna elements. Although FIG. 30 illustrates the example in which the wireless communication interface 863 includes the multiple RF circuits 864, the wireless communication interface 863 may also include a single RF circuit 864.

The eNB 830 illustrated in FIG. 30, the processing unit 350 described with reference to FIG. 10 may be mounted in the wireless communication interface 855, a wireless communication interface 863 and/or the controller 851. Furthermore, the wireless communication unit 320 may be mounted in the wireless communication interface 863 (e.g., RF circuit 864). The antenna part 310 may be mounted in the antenna 840. The network communication unit 330 may be mounted in the controller 851 and/or the network interface 853. In addition, the storage unit 340 may be mounted in the memory 852.

<4-2. Application Examples Regarding UE and RSU>

First Application Example

FIG. 31 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 31. Although FIG. 31 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a radio local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 31. Although FIG. 31 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 31 via feeder lines, which are partially shown as dashed lines in the figure. The auxiliary controller 919 operates a minimum necessary function of the smartphone 900, for example, in a sleep mode.

In the smartphone 900 illustrated in FIG. 31, the processing unit 150 described with reference to FIG. 8, the processing unit 250 described with reference to FIG. 9 or the processing unit 540 described with reference to FIG. 11 may be mounted in the wireless communication interface 912 or the processor 901. Furthermore, the wireless communication unit 120, the wireless communication unit 220 or the wireless communication unit 520 may be mounted in the wireless communication interface 912 (e.g., RF circuit 914). The GNSS signal processing unit 130 or the GNSS signal processing unit 230 may be mounted in the sensor 907. The antenna part 110, the antenna part 210 or the antenna part 510 may be mounted in the antenna 916. In addition, the storage unit 140, the storage unit 240 or the storage unit 530 may be mounted in the memory 902.

Second Application Example

FIG. 32 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 32. Although FIG. 32 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a radio LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 32. Although FIG. 32 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 32 via feeder lines that are partially shown as dashed lines in the figure. The battery 938 accumulates power supplied form the vehicle.

In the car navigation device 920 illustrated in FIG. 32, the processing unit 150 described with reference to FIG. 8, the processing unit 250 described with reference to FIG. 9 or the processing unit 540 described with reference to FIG. 11 may be mounted in the wireless communication interface 933 or the processor 921. Furthermore, the wireless communication unit 120, the wireless communication unit 220 or the wireless communication unit 520 may be mounted in the wireless communication interface 933 (e.g., RF circuit 935). The GNSS signal processing unit 130 or the GNSS signal processing unit 230 may be mounted in the GPS module 924. The antenna part 110, the antenna part 210 or the antenna part 510 may be mounted in the antenna 937. In addition, the storage unit 140, the storage unit 240 or the storage unit 530 may be mounted in the memory 922.

The technology of the present disclosure may also be realized as an in-vehicle system (or a vehicle) 940 including one or more blocks of the car navigation device 920, the in-vehicle network 941, and a vehicle module 942. That is, the in-vehicle system (or a vehicle) 940 may be provided as the device including the processing unit 250 described with reference to FIG. 9. The vehicle module 942 generates vehicle data such as vehicle speed, engine speed, and trouble information, and outputs the generated data to the in-vehicle network 941.

5. CONCLUSION

An embodiment of the present disclosure has been described in detail with reference to FIGS. 1 to 32. As described above, the supporting device transmits a message, transmitted from the transmission device to the reception device using V2X communication, to the reception device in cooperation with the transmission device. The supporting device supports V2X communication of the transmission device and thus message arrival probability may be improved, and the number of retransmissions by the transmission device is reduced, thus decreasing power consumption of the transmission device.

It should be understood by those skilled in the art that various modifications, combinations, sub-combinations and alterations may occur depending on design requirements and other factors insofar as they are within the scope of the appended claims or the equivalents thereof.

Processes described using flowcharts and sequence diagrams in the specification may not necessarily be performed in the illustrated orders. Some processing steps may be executed in parallel. Further, additional processing steps may be employed and some processing steps may be omitted.

In addition, a computer program for causing a processor (e.g., CPU, DSP or the like) included in a device (e.g., UE 10, UE 20, eNB 30 or RSU 50, or a module for such devices) of the specification to function as a component (e.g., processing unit 150, processing unit 250, processing unit 350, processing unit 540 or the like) of the device (in other words, a computer program for causing the processor to execute operations of a component of the device) may also be generated. Further, a recording medium in which the computer program is recorded may be provided. Moreover, a device including a memory that stores the computer program and one or more processors that can execute the computer program (e.g., a base station, a base station device or a module for the base station device, or a terminal device or a module for the terminal device) may also be provided. In addition, a method including operations of components of the device is included in the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An electronic device including:

circuitry configured to receive a signal from at least one of a base station or road side unit (RSU);

determine whether the a least one of the base station or RSU support cooperative vehicle-to-X (V2X) communication; and perform cooperative V2X communication with a vehicle-mounted electronic device with support from the at least one of the base station or RSU based on the determination.

(2)

The electronic device of (1), wherein the signal received from the at least one of a base station or RSU is a discovery signal including information indicating whether cooperative V2X communication is supported.

(3)

The electronic device of any of (1) to (2), wherein the signal received from the at least one of the base station or RSU includes information in a system information block (SIB) or master information block (MIB) indicating whether cooperative V2X communication is supported.

(4)

The electronic device of any of (1) to (3), wherein the circuitry is configured to perform cooperative V2X communication with the vehicle-mounted electronic device with support from the at least one of the base station or RSU when it is determined that the at least one of the base station or RSU support cooperative V2X communication.

(5)

The electronic device of (4), wherein the circuitry is configured to perform cooperative V2X communication with the vehicle-mounted electronic device with support from the at least one of the base station or RSU by transmitting a message directly to the vehicle-mounted electronic device and transmitting the message to the at least one of the base station or RSU.

(6)

The electronic device of (5), wherein the circuitry is configured to transmit the message directly to the vehicle-mounted electronic device using device-to-device (D2D) communication.

(7)

The electronic device of any of (5) to (6), wherein the circuitry is configured to transmit control information to the vehicle-mounted electronic device for synthesizing the message transmitted from the electronic and the message relayed by the at least one of the base station or RSU.

(8)

The electronic device of (7), wherein the circuitry is configured to transmit the control information to the vehicle-mounted electronic device using device-to-device (D2D) communication.

(9)

The electronic device of any of (7) to (8), wherein the control information includes a coordinated multi-point (CoMP) indicator indicating that cooperative V2X transmission between the electronic device and the at least one of the base station or RSU is implemented.

(10)

The electronic device of (9), wherein the control information includes a CoMP type indicator indicating a type of the cooperative V2X transmission implemented between the electronic device and the at least one of the base station or RSU.

(11)

The electronic device of any of (7) to (10), wherein the control information includes at least one of a transmission device identifier that identifies the electronic device, a reception device identifier that identifies the vehicle-mounted electronic device and a reception device group identifier identifying a group of devices including the vehicle-mounted electronic device.

(12)

The electronic device of any of (7) to (11), wherein the control information includes at least one of a redundancy version or redundancy pattern corresponding to the message.

(13)

The electronic device of any of (7) to (12), wherein the control information indicates a number of repetitive transmissions of the message.

(14)

The electronic device of any of (7) to (13), wherein the control information indicates at least one of a message identifier identifying the message, modulation and coding scheme (MCS) information, timing advance information or frequency hopping indicator information.

(15)
The electronic device of any of (5) to (14), wherein control information for the vehicle-mounted electronic device to synthesize the message transmitted from the electronic and the message relayed by the at least one of the base station or RSU is transmitted by the at least one of the base station or RSU.

(16)
The electronic device of any of (5) to (15), wherein control information for the vehicle-mounted electronic device to synthesize the message transmitted from the electronic and the message relayed by the at least one of the base station or RSU is provided in at least one of a physical sidelink control channel (PSCCH) or a physical sidelink shared channel (PSCCH).

(17)
The electronic device of any of (5) to (16), wherein the circuitry is configured to inform the at least one of the base station or RSU of transmission resources to be used by the base station or RSU to relay the message to the vehicle-mounted electronic device.

(18)
The electronic device of any of (5) to (15), wherein the circuitry is configured to inform the vehicle-mounted electronic device and the at least one of the base station or RSU of transmission resources to be used by the base station or RSU to relay the message to the vehicle-mounted electronic device via a physical sidelink control channel (PSCCH).

(19)
The electronic device of any of (5) to (15), wherein the circuitry is configured to retransmit the message by retransmitting the message with an updated redundancy version, and the at least one of the base station or RSU is configured to update the redundancy version of the message so that a redundancy version of the relayed message coincides with the redundancy version of the message transmitted by the electronic device in a same time and frequency resource.

(20)
The electronic device of any of (5) to (15), wherein the circuitry is configured to transmit the message to the at least one of the base station or RSU via a PC5 interface and the at least one of the base station or RSU relays the message to the vehicle-mounted electronic device via a Uu interface.

(21)
The electronic device of any of (7) to (20), wherein the control information includes a time period during which the cooperative V2X transmission between the electronic device and the at least one of the base station or RSU is implemented.

(22)
The electronic device of any of (1) to (4), wherein the circuitry is configured to perform the cooperative V2X communication with the vehicle-mounted electronic device with support from the at least one of the base station or RSU by transmitting a message intended for the vehicle-mounted electronic device to the at least one of the base station or RSU which functions as a proxy for transmitting the message from the electronic device to the vehicle-mounted electronic device.

(23)
The electronic device of any of (1) to (22), wherein the circuitry is configured to perform the cooperative V2X communication with the vehicle-mounted electronic device with support from the at least one of the base station or RSU by transmitting a message intended for the vehicle-mounted electronic device to the at least one of the base station or RSU which forwards the message to the electronic device.

(24)
The electronic device of (23), wherein the circuitry is configured to transmit the message to the at least one of the base station or RSU via a PC5 interface and the at least one of the base station or RSU forwards the message to the vehicle-mounted electronic device via a Uu interface.

(25)
The electronic device of (24), wherein the circuitry is configured to transmit control information to the at least one of the base station or RSU specifying parameters for forwarding the message via the Uu interface.

(26)
The electronic device of (25), wherein the parameters include at least one of Uu multiplex parameters, a Uu multiplex transmission validity period, identification information of the transmission device, channel measurement information, identification information of the vehicle-mounted electronic device, a redundancy version corresponding to the message, and a number of repetitive transmissions of the message.

(27)
A method performed by an electronic device, the method including:
receiving a signal from at least one of a base station or road side unit (RSU);
determining whether the a least one of the base station or RSU support cooperative vehicle-to-X (V2X) communication; and
performing V2X communication with a vehicle-mounted electronic device with support from the at least one of the base station or RSU based on the determination.

(28)
A system including:
a network device including first circuitry configured to transmit a signal to a terminal device indicating whether the network device supports cooperative vehicle-to-X (V2X) transmission of messages from the terminal device to a vehicle-mounted terminal device;
receive, from the terminal device, a message intended for the vehicle-mounted terminal device; and
perform cooperative V2X communication with the vehicle-mounted terminal device by transmitting the message received from the terminal device to the vehicle-mounted terminal device.

(29)
The system of (28), further including:
the terminal device including second circuitry configured to receive the signal from the network device indicating whether the network device supports cooperative vehicle-to-X (V2X) transmission of messages from the terminal device to the vehicle-mounted terminal device;
determine whether the network device supports cooperative vehicle-to-X (V2X) communication; and
perform cooperative V2X communication with the vehicle-mounted electronic device with support from the network device based on the determination.

REFERENCE SIGNS LIST

10 UE
12 user
20 UE
22 moving object
30 eNB
40 GNSS satellite
50 RSU
110 antenna part 120 wireless communication unit
130 GNSS signal processing unit
140 storage unit
150 processing unit
210 antenna part
220 wireless communication unit
230 GNSS signal processing unit
240 storage unit
250 processing unit
310 antenna part
320 wireless communication unit
330 network communication unit
340 storage unit
350 processing unit
510 antenna part
520 wireless communication unit
530 storage unit
540 processing unit

The invention claimed is:

1. An electronic device comprising:
circuitry configured to
receive a signal from at least one of a base station or road side unit (RSU);
determine whether the at least one of the base station or RSU support cooperative vehicle-to-X (V2X) communication;
perform cooperative V2X communication with a vehicle-mounted electronic device with support from the at least one of the base station or RSU based on the determination;
perform cooperative V2X communication with the vehicle-mounted electronic device with support from the at least one of the base station or RSU when it is determined that the at least one of the base station or RSU support cooperative V2X communication; and
perform cooperative V2X communication with the vehicle-mounted electronic device with support from the at least one of the base station or RSU by transmitting a message directly to the vehicle-mounted electronic device and transmitting the message directly to the at least one of the base station or RSU,
wherein the circuitry is configured to transmit control information to the vehicle-mounted electronic device for synthesizing the message transmitted from the electronic device and the message relayed by the at least one of the base station or RSU, and
wherein the control information includes an indicator indicating that cooperative V2X transmission between the electronic device and the at least one of the base station or RSU is implemented.

2. The electronic device of claim 1, wherein
the signal received from the at least one of a base station or RSU is a discovery signal including information indicating whether cooperative V2X communication is supported.

3. The electronic device of claim 1, wherein
the signal received from the at least one of the base station or RSU includes information in a system information block (SIB) or master information block (MIB) indicating whether cooperative V2X communication is supported.

4. The electronic device of claim 1, wherein
the circuitry is configured to transmit the message directly to the vehicle-mounted electronic device using device-to-device (D2D) communication.

5. The electronic device of claim 1, wherein
the circuitry is configured to transmit the control information to the vehicle-mounted electronic device using device-to-device (D2D) communication.

6. The electronic device of claim 1, wherein
the control information includes an indicator indicating a type of the cooperative V2X transmission implemented between the electronic device and the at least one of the base station or RSU.

7. The electronic device of claim 1, wherein
the control information includes at least one of a transmission device identifier that identifies the electronic device, a reception device identifier that identifies the vehicle-mounted electronic device and a reception device group identifier identifying a group of devices including the vehicle-mounted electronic device.

8. The electronic device of claim 1, wherein
the control information includes at least one of a redundancy version or redundancy pattern corresponding to the message.

9. The electronic device of claim 1, wherein
the control information indicates a number of repetitive transmissions of the message.

10. The electronic device of claim 1, wherein
the control information indicates at least one of a message identifier identifying the message, modulation and coding scheme (MCS) information, timing advance information or frequency hopping indicator information.

11. The electronic device of claim 1, wherein
control information for the vehicle-mounted electronic device to synthesize the message transmitted from the electronic device and the message relayed by the at least one of the base station or RSU is transmitted by the at least one of the base station or RSU.

12. The electronic device of claim 1, wherein
control information for the vehicle-mounted electronic device to synthesize the message transmitted from the electronic device and the message relayed by the at least one of the base station or RSU is provided in at least one of a physical sidelink control channel (PSCCH) or a physical sidelink shared channel (PSSCH).

13. The electronic device of claim 1, wherein
the circuitry is configured to inform the at least one of the base station or RSU of transmission resources to be used by the base station or RSU to relay the message to the vehicle-mounted electronic device.

14. The electronic device of claim 1, wherein
the circuitry is configured to inform the vehicle-mounted electronic device and the at least one of the base station or RSU of transmission resources to be used by the base station or RSU to relay the message to the vehicle-mounted electronic device via a physical sidelink control channel (PSCCH).

15. The electronic device of claim 1, wherein
the circuitry is configured to retransmit the message by retransmitting the message with an updated redundancy version, and
the at least one of the base station or RSU is configured to update the redundancy version of the message so that a redundancy version of the relayed message coincides with the redundancy version of the message transmitted by the electronic device in a same time and frequency resource.

16. The electronic device of claim 1, wherein
the circuitry is configured to transmit the message to the at least one of the base station or RSU via a PC5 interface and the at least one of the base station or RSU relays the message to the vehicle-mounted electronic device via a Uu interface.

17. The electronic device of claim 1, wherein the control information includes a time period during which the cooperative V2X transmission between the electronic device and the at least one of the base station or RSU is implemented.

18. The electronic device of claim 1, wherein the circuitry is configured to perform the cooperative V2X communication with the vehicle-mounted electronic device with support from the at least one of the base station or RSU by transmitting a message intended for the vehicle-mounted electronic device to the at least one of the base station or RSU which functions as a proxy for transmitting the message from the electronic device to the vehicle-mounted electronic device.

19. The electronic device of claim 1, wherein the circuitry is configured to perform the cooperative V2X communication with the vehicle-mounted electronic device with support from the at least one of the base station or RSU by transmitting a message intended for the vehicle-mounted electronic device to the at least one of the base station or RSU which forwards the message to the electronic device.

20. The electronic device of claim 19, wherein the circuitry is configured to transmit the message to the at least one of the base station or RSU via a PC5 interface and the at least one of the base station or RSU forwards the message to the vehicle-mounted electronic device via a Uu interface.

21. The electronic device of claim 20, wherein the circuitry is configured to transmit control information to the at least one of the base station or RSU specifying parameters for forwarding the message via the Uu interface.

22. The electronic device of claim 21, wherein the parameters include at least one of Uu multiplex parameters, a Uu multiplex transmission validity period, identification information of the transmission device, channel measurement information, identification information of the vehicle-mounted electronic device, a redundancy version corresponding to the message, and a number of repetitive transmissions of the message.

23. A method performed by an electronic device, the method comprising:
receiving a signal from at least one of a base station or road side unit (RSU);
determining whether the at least one of the base station or RSU support cooperative vehicle-to-X (V2X) communication;
performing V2X communication with a vehicle-mounted electronic device with support from the at least one of the base station or RSU based on the determination;
performing cooperative V2X communication with the vehicle-mounted electronic device with support from the at least one of the base station or RSU when it is determined that the at least one of the base station or RSU support cooperative V2X communication; and
performing cooperative V2X communication with the vehicle-mounted electronic device with support from the at least one of the base station or RSU by transmitting a message directly to the vehicle-mounted electronic device and transmitting the message directly to the at least one of the base station or RSU;
transmitting control information to the vehicle-mounted electronic device for synthesizing the message transmitted from the electronic device and the message relayed by the at least one of the base station or RSU,
wherein the control information includes an indicator indicating that cooperative V2X transmission between the electronic device and the at least one of the base station or RSU is implemented.

24. A system comprising:
a network device including first circuitry configured to
transmit a signal to a terminal device indicating whether the network device supports cooperative vehicle-to-X (V2X) transmission of messages from the terminal device to a vehicle-mounted terminal device;
receive, from the terminal device, a message intended for the vehicle-mounted terminal device;
perform cooperative V2X communication with the vehicle-mounted terminal device by transmitting the message received from the terminal device to the vehicle-mounted terminal device,
wherein cooperative V2X communication is performed with the vehicle-mounted electronic device by the message being sent directly from the terminal device to the vehicle-mounted electronic device; and
transmit control information to the vehicle-mounted terminal device for synthesizing the message transmitted from the terminal device, and
wherein the control information includes an indicator indicating that cooperative V2X transmission is implemented.

25. The system of claim 24, further comprising:
the terminal device including second circuitry configured to receive the signal from the network device indicating whether the network device supports cooperative vehicle-to-X (V2X) transmission of messages from the terminal device to the vehicle-mounted terminal device;
determine whether the network device supports cooperative vehicle to-X (V2X) communication; and
perform cooperative V2X communication with the vehicle-mounted electronic device with support from the network device based on the determination.

* * * * *